US009023900B2

(12) United States Patent
Wang et al.

(10) Patent No.: US 9,023,900 B2
(45) Date of Patent: *May 5, 2015

(54) FISCHER-TROPSCH SYNTHESIS USING MICROCHANNEL TECHNOLOGY AND NOVEL CATALYST AND MICROCHANNEL REACTOR

(75) Inventors: Yong Wang, Richland, WA (US); Anna Lee Tonkovich, Marysville, OH (US); Terry Mazanec, Solon, OH (US); Francis P. Daly, Delaware, OH (US); Dave VanderWiel, Brecksville, OH (US); Jianli Hu, Kennewick, WA (US); Chunshe Cao, Kennewick, WA (US); Charles Kibby, Benicia, CA (US); Xiaohong Li, Richland, WA (US); Michael D. Briscoe, Katy, TX (US); Nathan Gano, Dublin, OH (US); Ya-Huei Chin, Richland, WA (US)

(73) Assignee: Velocys, Inc., Plain City, OH (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/397,942

(22) Filed: Feb. 16, 2012

(65) Prior Publication Data
US 2013/0217793 A1 Aug. 22, 2013

Related U.S. Application Data

(60) Continuation of application No. 12/718,356, filed on Mar. 5, 2010, now Pat. No. 8,188,153, which is a division of application No. 11/484,069, filed on Jul. 11, 2006, now Pat. No. 7,722,833, which is a division of application No. 10/766,297, filed on Jan. 28, 2004, now Pat. No. 7,084,180.

(51) Int. Cl.
*C10G 2/00* (2006.01)
*C07C 1/04* (2006.01)
(Continued)

(52) U.S. Cl.
CPC . *C10G 2/34* (2013.01); *B01J 23/75* (2013.01); *B01J 19/0093* (2013.01);
(Continued)

(58) Field of Classification Search
CPC ............... B01J 19/0093; B01J 2219/00783; B01J 2219/00822; B01J 2219/00824; B01J 2219/00831; B01J 2219/00835; B01J 2219/00855; B01J 2219/0086; B01J 2219/00873; B01J 23/75; B01J 23/755; B01J 23/83; B01J 23/8913; B01J 23/892; B01J 23/894; B01J 23/8986; B01J 23/94; B01J 35/0066; B01J 35/04; B01J 35/1019; B01J 35/1038; B01J 37/0201; B01J 37/0205; B01J 37/038; B01J 38/48; B01J 38/58; C10G 2300/1022; C10G 2400/04; C10G 2400/10; C10G 2/331; C10G 2/332; C10G 2/334; C10G 2/34; C10G 2/341; C10G 45/58; C10G 47/00
USPC .................. 502/325, 327, 332; 518/715, 717
See application file for complete search history.

(56) References Cited

U.S. PATENT DOCUMENTS 3,882,049 A 5/1975 Bertolacini et al. .......... 252/466
3,972,837 A 8/1976 Acres et al.
(Continued)

FOREIGN PATENT DOCUMENTS

DE 246257 6/1987
DE 39 26 466 A1 2/1991
(Continued)

OTHER PUBLICATIONS

European Office Action, Application No. 04 814 270.7, dated Apr. 24, 2013.
(Continued)

*Primary Examiner* — Jafar Parsa
*Assistant Examiner* — Amy C Bonaparte
(74) *Attorney, Agent, or Firm* — Renner, Otto, Boisselle & Sklar, LLP

(57) ABSTRACT

Disclosed is a process for converting a reactant composition comprising $H_2$ and CO to a product comprising at least one aliphatic hydrocarbon having at least about 5 carbon atoms, the process comprising: flowing the reactant composition through a microchannel reactor in contact with a Fischer-Tropsch catalyst to convert the reactant composition to the product, the microchannel reactor comprising a plurality of process microchannels containing the catalyst; transferring heat from the process microchannels to a heat exchanger; and removing the product from the microchannel reactor; the process producing at least about 0.5 gram of aliphatic hydrocarbon having at least about 5 carbon atoms per gram of catalyst per hour; the selectivity to methane in the product being less than about 25%. Also disclosed is a supported catalyst comprising Co, and a microchannel reactor comprising at least one process microchannel and at least one adjacent heat exchange zone.

94 Claims, 10 Drawing Sheets

(51) Int. Cl.
*B01J 19/00* (2006.01)
*B01J 37/03* (2006.01)
*B01J 38/48* (2006.01)
*B01J 23/94* (2006.01)
*B01J 37/02* (2006.01)
*B01J 23/755* (2006.01)
*B01J 23/83* (2006.01)
*B01J 23/889* (2006.01)
*B01J 23/89* (2006.01)
*B01J 35/00* (2006.01)
*B01J 35/04* (2006.01)
*B01J 35/10* (2006.01)
*C10G 45/58* (2006.01)
*C10G 47/00* (2006.01)
*B01J 23/75* (2006.01)
*B01J 21/04* (2006.01)
*B01J 38/58* (2006.01)

(52) U.S. Cl.
CPC ............... *B01J 2219/00783* (2013.01); *B01J 2219/00822* (2013.01); *B01J 2219/00824* (2013.01); *B01J 2219/00831* (2013.01); *B01J 2219/00835* (2013.01); *B01J 2219/00855* (2013.01); *B01J 2219/0086* (2013.01); *B01J 2219/00873* (2013.01); *B01J 37/038* (2013.01); *B01J 38/48* (2013.01); *B01J 38/58* (2013.01); *B01J 23/94* (2013.01); *B01J 37/0205* (2013.01); *B01J 23/755* (2013.01); *B01J 23/83* (2013.01); *B01J 23/8896* (2013.01); *B01J 23/8913* (2013.01); *B01J 23/892* (2013.01); *B01J 23/894* (2013.01); *B01J 23/8986* (2013.01); *B01J 35/0066* (2013.01); *B01J 35/04* (2013.01); *B01J 35/1019* (2013.01); *B01J 35/1038* (2013.01); *B01J 37/0201* (2013.01); *C10G 45/58* (2013.01); *C10G 47/00* (2013.01); *C10G 2/331* (2013.01); *C10G 2/332* (2013.01); *C10G 2/334* (2013.01); *C10G 2/341* (2013.01); *C10G 2300/1022* (2013.01); *C10G 2400/04* (2013.01); *C10G 2400/10* (2013.01)

(56) References Cited

U.S. PATENT DOCUMENTS

| | | | |
|---|---|---|---|
| 4,089,810 A | 5/1978 | Diwell et al. | |
| 4,096,095 A | 6/1978 | Cairns | |
| 4,289,652 A | 9/1981 | Hunter et al. | |
| 4,392,362 A | 7/1983 | Little | 62/514 |
| 4,516,632 A | 5/1985 | Swift et al. | 165/167 |
| 4,585,798 A | 4/1986 | Beuther et al. | 518/715 |
| 4,738,948 A | 4/1988 | Iglesia et al. | 502/325 |
| 5,036,032 A | 7/1991 | Iglesia et al. | 502/260 |
| 5,248,251 A | 9/1993 | Dalla Betta et al. | |
| 5,309,637 A | 5/1994 | Moriarty | 29/890.054 |
| 5,317,805 A | 6/1994 | Hoopman et al. | 29/890.03 |
| 5,382,741 A | 1/1995 | Astbury et al. | 585/652 |
| 5,534,328 A | 7/1996 | Ashmead et al. | 428/166 |
| 5,569,455 A | 10/1996 | Fukui et al. | 422/174 |
| 5,611,214 A | 3/1997 | Wegeng et al. | 62/498 |
| 5,727,618 A | 3/1998 | Mundinger et al. | 165/80.4 |
| 5,733,839 A | 3/1998 | Espinoza et al. | 502/336 |
| 5,811,062 A | 9/1998 | Wegeng et al. | 422/129 |
| 5,858,314 A | 1/1999 | Hsu et al. | 422/211 |
| 6,040,266 A | 3/2000 | Fay, III et al. | |
| 6,075,062 A | 6/2000 | Zennaro et al. | 518/715 |
| 6,090,742 A | 7/2000 | Culross | |
| 6,121,190 A | 9/2000 | Zennaro et al. | |
| 6,126,723 A | 10/2000 | Drost et al. | 96/4 |
| 6,129,973 A | 10/2000 | Martin et al. | 428/166 |
| 6,136,868 A | 10/2000 | Culross et al. | 518/700 |
| 6,156,698 A | 12/2000 | Iida et al. | 502/439 |
| 6,192,596 B1 | 2/2001 | Bennett et al. | 34/76 |
| 6,200,536 B1 | 3/2001 | Tonkovich et al. | 422/177 |
| 6,211,255 B1 | 4/2001 | Schanke et al. | 518/715 |
| 6,216,343 B1 | 4/2001 | Leland et al. | 29/890.032 |
| 6,220,497 B1 | 4/2001 | Benz et al. | 228/118 |
| 6,230,408 B1 | 5/2001 | Ehrfeld et al. | 29/890.039 |
| 6,262,131 B1 | 7/2001 | Arcuri et al. | 518/700 |
| 6,313,393 B1 | 11/2001 | Drost | 136/201 |
| 6,352,577 B1 | 3/2002 | Martin et al. | 96/4 |
| 6,353,035 B2 | 3/2002 | Manzer et al. | 518/700 |
| 6,368,997 B2 | 4/2002 | Herron et al. | 502/302 |
| 6,381,846 B2 | 5/2002 | Insley et al. | 29/890.039 |
| 6,415,860 B1 | 7/2002 | Kelly et al. | 165/748 |
| 6,440,895 B1 | 8/2002 | Tonkovich et al. | |
| 6,451,864 B1 | 9/2002 | Wang et al. | 518/715 |
| 6,476,085 B2 | 11/2002 | Manzer et al. | 518/715 |
| 6,479,428 B1 | 11/2002 | Tonkovich et al. | 502/302 |
| 6,488,838 B1 | 12/2002 | Tonkovich et al. | 208/108 |
| 6,491,880 B1 | 12/2002 | Wang et al. | 422/211 |
| 6,537,945 B2 | 3/2003 | Singleton et al. | 502/327 |
| 6,540,975 B2 | 4/2003 | Tonkovich et al. | 423/659 |
| 6,558,634 B1 | 5/2003 | Wang et al. | 422/173 |
| 6,660,237 B2 | 12/2003 | Wang et al. | 422/222 |
| 6,675,875 B1 | 1/2004 | Vafai et al. | 165/80.4 |
| 6,746,651 B1 | 6/2004 | Ponzo et al. | 422/220 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,756,340 B2 | 6/2004 | Voskoboynikov et al. | 502/328 |
| 6,756,515 B2 | 6/2004 | Rende et al. | 585/444 |
| 6,764,660 B1 | 7/2004 | Wiede, Jr. et al. | 422/198 |
| 6,769,444 B2 | 8/2004 | Guzman et al. | 137/15.01 |
| 6,770,245 B2 | 8/2004 | Akporiaye et al. | 422/82.12 |
| 6,773,684 B2 | 8/2004 | Lesieur et al. | 422/198 |
| 6,824,689 B2 | 11/2004 | Wang et al. | |
| 7,045,486 B2 | 5/2006 | Wang et al. | 502/439 |
| 7,084,180 B2* | 8/2006 | Wang et al. | 518/712 |
| 7,722,833 B2 | 5/2010 | Wang et al. | 422/198 |
| 7,829,602 B2 | 11/2010 | Litt et al. | |
| 8,188,153 B2* | 5/2012 | Wang et al. | 518/715 |
| 2002/0028853 A1 | 3/2002 | Manzer et al. | 518/713 |
| 2002/0048541 A1 | 4/2002 | Schodel et al. | 422/198 |
| 2002/0188031 A1 | 12/2002 | Kibby | 518/715 |
| 2003/0105171 A1 | 6/2003 | Subramanian et al. | 518/715 |
| 2003/0116503 A1 | 6/2003 | Wang et al. | 210/660 |
| 2003/0185721 A1 | 10/2003 | Wang et al. | 422/177 |
| 2003/0219903 A1 | 11/2003 | Wang et al. | 436/37 |
| 2004/0104010 A1 | 6/2004 | Kenny et al. | 165/80.4 |
| 2004/0107831 A1 | 6/2004 | Graham et al. | 95/96 |
| 2004/0123626 A1 | 7/2004 | Caze et al. | 65/17.2 |
| 2004/0125689 A1 | 7/2004 | Ehrfeld et al. | 366/165.1 |
| 2004/0127352 A1 | 7/2004 | Jin et al. | 502/322 |
| 2004/0130057 A1 | 7/2004 | Mehrabi et al. | 264/171.13 |
| 2004/0131345 A1 | 7/2004 | Kylberg et al. | 392/465 |
| 2004/0131507 A1 | 7/2004 | Saitmacher et al. | 422/111 |
| 2004/0131829 A1 | 7/2004 | Joseph et al. | 428/166 |
| 2004/0132832 A1 | 7/2004 | Espinoza et al. | 518/716 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |

FOREIGN PATENT DOCUMENTS

| | | |
|---|---|---|
| DE | 3926466 | 2/1991 |
| EP | 1 311 341 B1 | 8/2001 |
| EP | 0 904 608 B1 | 12/2001 |
| EP | 1 362 634 A1 | 11/2003 |
| EP | 1102628 | 11/2006 |
| GB | 1531134 | 11/1978 |
| GB | 2077136 | 12/1981 |
| JP | 2002501430 | 1/2002 |
| JP | 2002126498 | 5/2002 |
| WO | 9421372 | 9/1994 |
| WO | 9700442 | 1/1997 |

(56) References Cited

FOREIGN PATENT DOCUMENTS

| WO | 97/32687 | 9/1997 |
|---|---|---|
| WO | 9828073 | 7/1998 |
| WO | 9838147 | 9/1998 |
| WO | 98/55812 | 12/1998 |
| WO | 9916542 | 4/1999 |
| WO | 00/06295 | 2/2000 |
| WO | 0006301 | 2/2000 |
| WO | 01/10773 A1 | 2/2001 |
| WO | 01/12312 A2 | 2/2001 |
| WO | 01/12753 A1 | 2/2001 |
| WO | 01/54807 A1 | 8/2001 |
| WO | 01/95237 A2 | 12/2001 |
| WO | 0196015 | 12/2001 |
| WO | 02/064248 | 8/2002 |
| WO | 02064248 | 8/2002 |
| WO | 03/006149 | 1/2003 |
| WO | 03/006149 A1 | 1/2003 |
| WO | 03/026788 | 4/2003 |
| WO | 03/099429 | 4/2003 |
| WO | 03/078052 A1 | 9/2003 |
| WO | 03078052 | 9/2003 |
| WO | 03/106386 A2 | 12/2003 |
| WO | 2004/045760 | 6/2004 |
| WO | 2004/050799 | 6/2004 |
| WO | 2004/052530 | 6/2004 |
| WO | 2004/052941 | 6/2004 |
| WO | 2004/054013 | 6/2004 |
| WO | 2004052518 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 A1 | 8/2004 |
| WO | 2004/067708 | 8/2004 |
| ZA | 855317 | 7/1985 |

OTHER PUBLICATIONS

Japanese Questioning, Application No. 2006-551076, mailed May 21, 2013.
Extended European Search Report, Application No. 13160226.0, dated May 7, 2013.
EP Communication purusant to ARticle 94(3) EPC, Application No. 04814270.7, dated Apr. 24, 2013.
Notice of Allowance, Canadian Patent Application No. 2,552,283, dated May 3, 2013.
Extended European Search Report, Applicatin No. 13160227.8, dated May 7, 2013.
Jacobs et al.; "Fischer-Tropsch synthesis: support, loading, and promoter effects on reducibility of cobalt catalysts"; Applied Catalysis A: General 233; 2002; pp. 263-281.
Russian Office Action, Application No. 2006130871.
Australian Office Action, Application No. 2010202533, issued Oct. 17, 2012.
Australian Office Action, Application No. 2010202533, dated Oct. 19, 2011.
Canadian Office Action, Application No. 2,552,283, dated Feb. 28, 2011.
Canadian Office Action, Application No. 2,552,283, dated Dec. 2, 2011.
European Office Action, Application No. 04814270.7, dated Mar. 21, 2011.
Canadian Office Action, Application No. 2,552,283, dated Jul. 9, 2012.
Japanese Office Action, Application No. 2006-551076, dated Feb. 22, 2011.
Japanese Office Action, Application No. 2006-551076, dated Sep. 13, 2011.
Japanese Patent Office Notification of Reasons for Refusal, Application No. 2006-551076, mailed Sep. 13, 2011.
Japanese Application 2006-551076, Office Action dated Sep. 13, 2011, English language translation.
Japanese Application 2006-551076, Office Action Dated Sep. 4, 2012, English language translation.
European Application 04814270.7-2104, Office Action dated Mar. 21, 2011.
Russian Application 2006130871 (033542), Office Action dated Jul. 4, 2011, with English language translation.
Russian Application 2006130871 (033542), Office Action dated Feb. 7, 2008, with English language translation.
Besser, Ronald S. "New Directions in Reactor Design Through Miniaturization", Sep. 13, 2002, Tulane Engineering Forum.
International Preliminary Report on Patentability; Application No. PCT/US2004/042065, mailed Feb. 17, 2006.
International Search Report and Written Opinion; Application No. PCT/US2004/042065; mailed Jun. 29, 2005.
Lekhal et al.; "Impact of Drying on the Catalyst Profile in Supported Impregnation Catalysts"; Chemical Engineering Science 56 (2001): 4473-4487.
Matlosz et al.; "Microreactors as Toots in Chemical Research"; Microreaction Technology; IMRET 5: Proceedings of the Fifth international Conference on Microreaction Technology. 2001.
Rostami et al.; "Flow and Heat Transfer for Gas Flowing in Microchannels: a Review", Heat and Mass Transfer 38 (2002) 359-367.
Srinivasn et al.; "Micromachined Reactors for Catalytic Partial Oxidation Reactions", AIChE Journal; Nov. 1997; vol, 43, No. 11; pp. 3059-3069.
TeGrotenhuis et al.; Optimizing Microchannel Reactors by Trading-Off Equilibrium and Reaction Kinetics through Temperature Management; Prepared for presentation at IMRET 6—6$^{th}$ International Conference on Microreaction Technology; Mar. 2002.
Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng, Chem. Res., 2003, 42, 5462-5466.
Stranges; "Germany's Synthetic fuel Industry 1927-45"; AIChE 2003 Spring National Meeting, New Orleans, LA, 2003.
Kuila; "Characterization of Alumina and Silica Sol-Gel Encapsulated Fe/Co/Ru Nanocatalysts in Miorochannel Reactors for F-T Synthesis of Higher Aikanes"; Mat. Res. Soc. Synp. Proc. vol. 280, Materials Research Society; MRS Spring Meeting, San Francisco, CA, 2004.
Snyder; World Oil, Jun. 2003; www.worldoil.com/magazine.
Mazanec "Miorochannel technology for gas-to-liquids conversion"; *PTQ*, Oct. 2003; pp, 149-153.
Hoek; "The Shell Middle Distillate Synthesis Process—Facts, Technology and Perspective"; Presented at CatCon, Houston, TX, May 2003.
Office Action, U.S. Appl. No. 90/011,089, mailed Jun. 9, 2011.
European office action, Application No. 04 814 270.7-2104, dated Mar. 21, 2011.
Japanese Office Action, Application No. 2006-551076: dated Feb. 22, 2011.
Canadian Office Action Application No. 2,552,283, dated Feb. 28, 2011.
U.S. Appl. No. 90/011,089; Litigation Search Report dated Sep. 13, 2011.
U.S. Appl. No. 90/011,089, Notice of Intent to Issue Ex Parte Reexamination Certificate mailed Sep. 26, 2011.
Anderson; "The Fischer-Tropsch Synthesis"; Academic Press, Inc.; 1984, pp. 1-7.
Avila et al.; "Monolithic reactors for environmental applications A review on preparation technologies"; Chemical Engineering Journal 109 (2005); pp. 11-36.
Chaston; "The Oxidation of the Platinum Metals"; Platinum Metals Rev., 1975, 19, (4), pp. 135-140.
Deng et al.; "Characterisation of alumina scales on Fecralloy using impedance spectroscopy"; Thin Solid Films 516 (2008); pp. 5027-5031.
ERG Materials and Aerospace Corporation; "Metal Foam Introduction" (2010), http://www.ergaerospace.com/metal_foam.htm.

(56) References Cited

OTHER PUBLICATIONS

Gandhi et al.; "Automotive exhaust catalysis", Journal of Catalysis 216 (2003); pp. 433-442.
Giroux et al.; "Monolithic structures as alternatives to particulate catalysts for the reforming of hydrocarbons for hydrogen generation"; Applied Catalysis B; Environmental 56 (2005); pp. 95-110.
Irandoust et al.; "Monolithic, Catalysts for Nonautomobile Applications"; Catal. Rev.—Sci. Eng., 30(3), 341-392 (1988).
Queheillalt et al.; "Synthesis of open-cell metal foams by template directed vapor deposition"; J. Mater. Res., vol. 16, No. 4, Apr. 2001, pp. 1028-1036.
Chinese Office Action, Application No. 200480041082.9, issued Aug. 22, 2008.
Australian Office Action, Application No. 2004315214, dated Jun. 17, 2009.
Australian Office Action, Application No. 2004315214, dated Apr. 8, 2010.
Dohntec Ceramics Ltd.; "Corderite Honeycomb Monolith," (2010); http://www.random-packing.com/product/27-cordierite-honey-comb-monolith-12-d3f5.
Catacel Corporation, "SMR catalyst Reaches 17,500 Hour Benchmark," Thomas Net News, (2010), http://www.news.thomasnet.com/companystory/Catacel-s-Novel-SMR-Catalyst-Reaches-17-500-....
Notice of Allowance, Chinese Application 200480041082.9, issued Jun. 5, 2009.
Issue Notification, Patent No. 7,084,180, mailed Jul. 12, 2006.
Notice of Allowance, U.S. Appl. No. 10/766,297, mailed Mar. 31, 2006.
Office Action, U.S. Appl. No. 10/766,297, mailed Dec. 16, 2005.
Office Action, U.S. Appl. No. 10/766,297, mailed Sep. 21, 2005.
Issue Notification, Patent No. 7,722,833, mailed May 5, 2010.
Notice of Allowance, U.S. Appl. No. 11/484,069, mailed Dec. 16, 2009.
Office Action, U.S. Appl. No. 11/484,069, mailed May 11, 2009.
Office Action, U.S. Appl. No. 11/484,069, mailed Jan. 28, 2009.
Office Action, U.S. Appl. No. 90/011,089, mailed Jan. 13, 2011.
Third-Party Requester's Response to the Patent Owner's Statement, U.S. Appl. No. 90/011,089, filed Dec. 21, 2010.
Patent Owner's Statement in Response to Order Granting Reques for Ex Parte Reexamination, U.S. Appl. No. 90/011,089, filed Oct. 22, 2010.
Office Action, U.S. Appl. No. 90/011,089, mailed Sep. 1, 2010.
Transmittal of Replacement Statement and Replacement 1449 Associated with Request for Ex Parte Reexamination, U.S. Appl. No. 90/011,089, filed Jul. 23, 2010.
Request for Ex Parte Reexamination Transmittal Form and Request for Ex Parfe Reexamination of Patent No. 7,084,180, filed Jul. 9, 2010.
Cybulski et al.; "Monoliths in Heterogeneous Catalysis"; Catal. Rev.—Sci. Eng., 36(2). 179-270 (1994).
Bennett et al.; "Microchannel cooled heatsinks for high average power laser diode arrays"; SPIE, vol. 1865; 1993; pp. 144-153.
Iglesia; "Design, synthesis, and use of cobalt-based Fischer-Tropsch synthesis"; Applied Catalysis A: General 161 (1997); pp. 59-78.
Invitation to Pay Additional Fees and Partial International Search Report for PCT/US2004/042065 mailed Apr. 1, 2005.
Ouyang et al.; "Flexible Microreactor System for Chemical Research at Moderate and High Temperatures"; Stevens Institute of Technology; 2003.
Wegeng et al.; "Compact Fuel Processors for Fuel Cell Powered Automobiles Based on Microchannel Technology"; Fuel Cells Bulletin No. 28; pp. 8-13; Jan. 2001.

\* cited by examiner

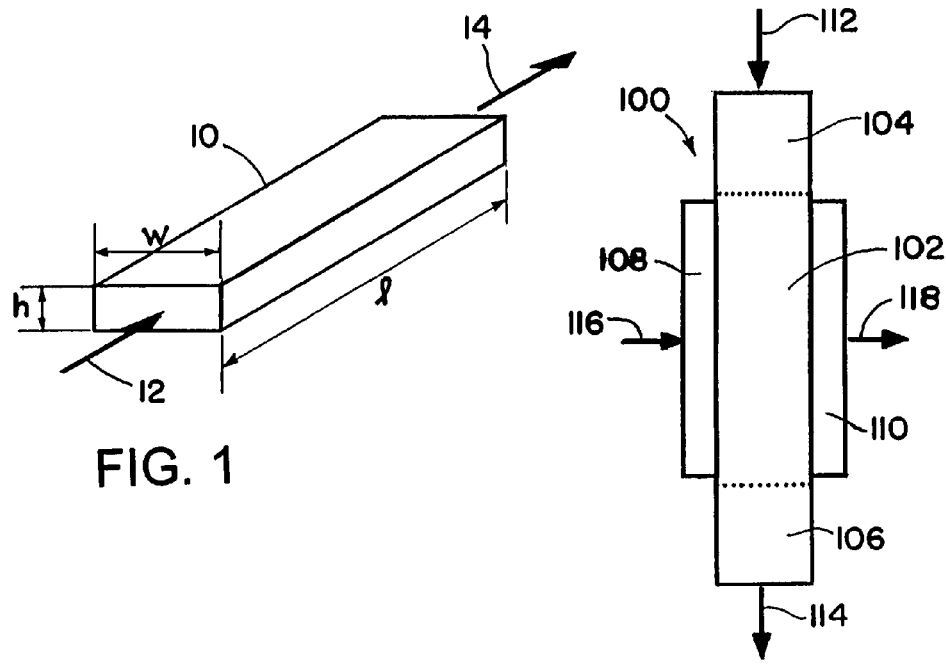
FIG. 1
FIG. 2
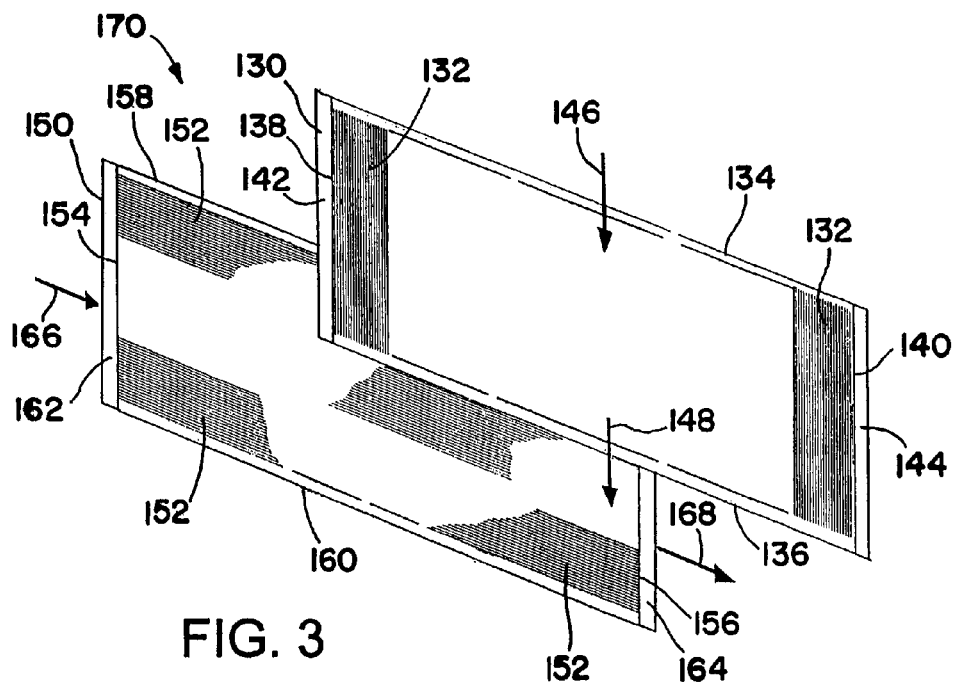
FIG. 3 ns of the process microchannel entrance. In one embodiment, the at least one heat exchange zone comprises a first heat exchange zone and a second heat exchange zone, the length of the second heat exchange zone being less than the length of the first heat exchange zone.

FISCHER-TROPSCH SYNTHESIS USING MICROCHANNEL TECHNOLOGY AND NOVEL CATALYST AND MICROCHANNEL REACTOR

The present application is a continuation of and claims priority under 35 U.S.C. §120 commonly assigned U.S. application Ser. No. 12/718,356 filed Mar. 5, 2010 (now issued as U.S. Pat. No. 8,188,153), which is a divisional of U.S. application Ser. No. 11/484,069, filed Jul. 11, 2006 (now issued as U.S. Pat. No. 7,722,833), which is a divisional of U.S. application Ser. No. 10/766,297, filed Jan. 28, 2004 (now issued as U.S. Pat. No. 7,084,180).

TECHNICAL FIELD

This invention relates to a Fischer-Tropsch synthesis process using microchannel technology, and a novel catalyst and microchannel reactor. The catalyst and reactor are useful in Fischer-Tropsch synthesis processes.

BACKGROUND OF THE INVENTION

The Fischer-Tropsch synthesis reaction involves converting a reactant composition comprising $H_2$ and CO in the presence of a catalyst to aliphatic hydrocarbon products. The reactant composition may comprise the product stream from another reaction process such as steam reforming (product stream $H_2/CO\sim3$), partial oxidation (product stream $H_2/CO\sim2$), autothermal reforming (product stream $H_2/CO\sim2.5$), $CO_2$ reforming ($H_2/CO\sim1$), coal gasification (product stream $H_2/CO\sim1$), and combinations thereof. The aliphatic hydrocarbon products may range from methane to paraffinic waxes of up to 100 carbon atoms or more.

Conventional reactors such as tubular fixed bed reactors and slurry reactors have various problems in heat and mass transfer resulting in limitations of choice of process conditions for Fischer-Tropsch synthesis reactions. Hot spots in the fixed bed reactors significantly promote methane formation, reduce the heavy hydrocarbon selectivity and deactivate the catalyst. On the other hand, strong mass transfer resistance inherent in a catalyst suspended in a slurry system generally reduces the effective reaction rate and also causes difficulty in separation of catalysts from the products. This invention provides a solution to these problems.

This invention relates to a process for conducting a Fischer-Tropsch synthesis reaction in a microchannel reactor wherein the one-pass conversion of CO within the reactor is enhanced and the selectivity to methane is reduced. With the inventive process the tendency to form hot spots in the microchannel reactor is reduced. This reduction in the tendency to form hot spots is believed to be due, at least in part, to the fact that the microchannel reactor provides enhanced heat transfer characteristics and more precise control of temperatures and residence times as compared to prior art processes wherein microchannel reactors are not used. With this process, it is possible to obtain relatively high levels of conversion of the CO and high levels of selectivity to the desired product (e.g., hydrocarbons in the middle distillate range) as compared to such prior art. A novel catalyst as well as a novel microchannel reactor design are provided.

SUMMARY OF THE INVENTION

This invention relates to a process for converting a reactant composition comprising $H_2$ and CO to a product comprising at least one aliphatic hydrocarbon having at least about 5 carbon atoms, the process comprising: flowing the reactant composition through a microchannel reactor in contact with a Fischer-Tropsch catalyst to convert the reactant composition to the product, the microchannel reactor comprising a plurality of process microchannels containing the catalyst; transferring heat from the process microchannels to a heat exchanger; and removing the product from the microchannel reactor; the process producing at least about 0.5 gram of aliphatic hydrocarbon having at least about 5 carbon atoms per gram of catalyst per hour; the selectivity to methane in the product being less than about 25%.

In one embodiment, the heat exchanger comprises a plurality of heat exchange channels adjacent to the process microchannels. In one embodiment, the heat exchange channels are microchannels.

In one embodiment, the invention relates to a catalyst comprising Co supported on alumina, the loading of Co being at least about 25% by weight, the Co dispersion being at least about 3%. This catalyst may further comprise Re, Ru or a mixture thereof.

In one embodiment, the invention relates to a catalyst, the catalyst comprising Co and a support, the catalyst being made by the steps of: (A) impregnating the support with a composition comprising Co to provide an intermediate catalytic product; (B) calcining the intermediate catalytic product; (C) impregnating the calcined intermediate product formed in step (B) with a composition comprising Co to provide another intermediate catalytic product; and (D) calcining the another intermediate catalytic product formed in step (C) to form the catalyst, the catalyst having a Co loading of at least about 25% by weight. The composition comprising Co used in step (A) may be the same as or it may be different than the composition comprising Co used in step (C). The support may comprise alumina.

In one embodiment, the invention relates to a microchannel reactor, comprising: at least one process microchannel, the process microchannel having an entrance and an exit; and at least one heat exchange zone adjacent to the process microchannel, the heat exchange zone comprising a plurality of heat exchange channels, the heat exchange channels extending lengthwise at right angles relative to the lengthwise direction of the process microchannel; the heat exchange zone extending lengthwise in the same direction as the process microchannel and being positioned near the process microchannel entrance; the length of the heat exchange zone being less than the length of the process microchannel; the width of the process microchannel at or near the process microchannel exit being greater than the width of the process microchannel at or near the process microchannel entrance. In one embodiment, the at least one heat exchange zone comprises a first heat exchange zone and a second heat exchange zone, the length of the second heat exchange zone being less than the length of the first heat exchange zone.

BRIEF DESCRIPTION OF THE DRAWINGS

In the annexed drawings, like parts and features have like designations.

FIG. 1 is a schematic illustration of a microchannel that may be used with the inventive process.

FIG. 2 is a schematic flow sheet illustrating the inventive Fischer-Tropsch synthesis process in a particular form wherein a reactant composition comprising CO and $H_2$ flows through a microchannel reactor in contact with a Fischer-Tropsch catalyst and reacts to form a product comprising at least one aliphatic hydrocarbon.

FIG. 3 is a schematic illustration of a layer of process microchannels and a layer of heat exchange microchannels that may be used in the microchannel reactor core of the microchannel reactor illustrated in FIG. 2.

DETAILED DESCRIPTION OF THE INVENTION

Figure 4:
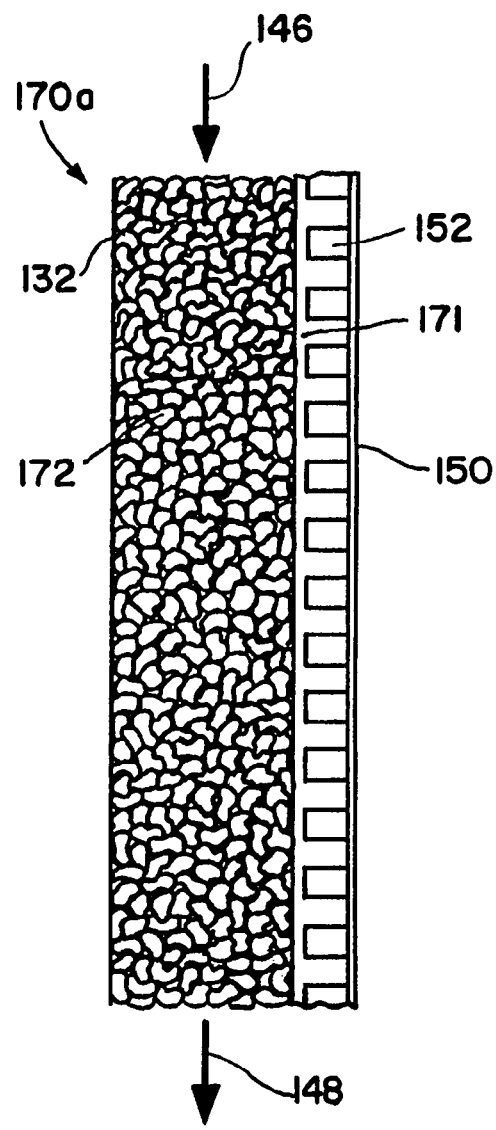
FIG. 4 is a schematic illustration of a process microchannel and an adjacent heat exchange zone that may be used in the microchannel reactor core of the microchannel reactor illustrated in FIG. 2, the heat exchange zone containing a plurality of heat exchange channels extending lengthwise at right angles relative to the lengthwise direction of the process microchannel, the flow of heat exchange fluid through the heat exchange channels being cross-current relative to the flow of reactant composition and product through the process microchannel.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. The flow of fluid through the microchannel may proceed along the length of the microchannel normal to the height and width of the microchannel. An example of a microchannel that may be used with the inventive process as a process microchannel and/or a heat exchange microchannel is illustrated in FIG. 1. The microchannel 10 illustrated in FIG. 1 has a height (h), width (w) and length (l). Fluid flows through the microchannel 10 along the length of the microchannel in the direction indicated by arrows 12 and 14. The height (h) or width (w) of the microchannel may be in the range of about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. The other dimension of height or width may be of any dimension, for example, up to about 3 meters, and in one embodiment about 0.01 to about 3 meters, and in one embodiment about 0.1 to about 3 meters. The length (l) of the microchannel may be of any dimension, for example, up to about 10 meters, and in one embodiment about 0.2 to about 10 meters, and in one embodiment from about 0.2 to about 6 meters, and in one embodiment from 0.2 to about 3 meters. Although the microchannel 10 illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "adjacent" when referring to the position of one channel relative to the position of another channel means directly adjacent such that a wall separates the two channels. This wall may vary in thickness. However, "adjacent" channels are not separated by an intervening channel that would interfere with heat transfer between the channels. In one embodiment, one channel may be adjacent to another channel over only part of the dimension of the another channel. For example, a process microchannel may be longer than and extend beyond one or more adjacent heat exchange channels.

The term "fluid" refers to a gas, a liquid, or a gas or a liquid containing dispersed solids or liquid droplets.

The term "contact time" refers to the volume of the reaction zone within the microchannel reactor divided by the volumetric feed flow rate of the reactant composition at a temperature of 0° C. and a pressure of one atmosphere.

The term "residence time" refers to the internal volume of a space (e.g., the reaction zone within a microchannel reactor) occupied by a fluid flowing through the space divided by the average volumetric flowrate for the fluid flowing through the space at the temperature and pressure being used.

The term "reaction zone" refers to the space within the process microchannels wherein the reactants contact the catalyst.

The term "conversion of CO" refers to the CO mole change between the reactant composition and product divided by the moles of CO in the reactant composition.

The term "selectivity to methane" refers to the moles of methane in the product divided by the moles of methane plus two times the number of moles of $C_2$ hydrocarbons in the product, plus three times the number of moles of $C_3$ hydrocarbons in the product, plus four times the number of moles of $C_4$ hydrocarbons in the product, etc., until all of the moles of hydrocarbons in the product have been included.

The term "one-pass conversion of CO" refers to the conversion of CO after one pass through the microchannel reactor employed with the inventive process.

The term "yield of product" refers to conversion of CO multiplied by selectivity to the indicated product(s).

The term "metal dispersion" refers to the percent of catalytically active metal atoms and promoter atoms on the surface of the catalyst as compared to the total number of metal atoms in the catalyst as measured by hydrogen chemisorption which is described in "Heterogeneous Catalysis in Industrial Practice," $2^{nd}$ ed., Charles N. Satterfield, p. 139, McGraw Hill (1996), which is incorporated herein by reference.

In the expression "about 0.5 gram of aliphatic hydrocarbon having at least about 5 carbon atoms per gram of catalyst per hour" the weight or number of grams of catalyst refers to the total weight of the catalyst consisting of the catalytic metal (e.g., Co) or oxide thereof, optional co-catalyst (e.g., Re or Ru), and/or promoter (e.g., Na, K, etc.) as well as the weight of any support (e.g., alumina). However, if the catalyst is supported on an engineered support structure such as a foam, felt, wad or fin, the weight of such engineered support structure is not included in the calculation of the weight or number of grams of catalyst. Similarly, if the catalyst is adhered to the microchannel walls, the weight of the microchannel walls is not included in the calculation.

The term "Co loading" refers to the weight of the Co in the catalyst divided by the total weight of the catalyst, that is, the total weight of the Co plus any co-catalyst or promoter as well as the support. If the catalyst is supported on an engineered support structure such as a foam, felt, wad or fin, the weight of such engineered support structure is not included in the calculation. Similarly, if the catalyst is adhered to the microchannel walls, the weight of the microchannel walls is not included in the calculation.

Referring to FIG. 2, the process may be conducted using a microchannel reactor 100 which includes microchannel reactor core 102, reactant header 104, product footer 106, heat exchange header 108 and heat exchange footer 110. The microchannel reactor core 102 contains a plurality of process microchannels and a plurality of heat exchange channels adjacent to the process microchannels. The heat exchange channels may be microchannels. The process microchannels and heat exchange channels may be aligned in layers, one above the other, or side by side. A Fischer-Tropsch catalyst is contained within the process microchannels. The process header 104 provides a passageway for fluid to flow into the process microchannels with an even or substantially even distribution of flow to the process microchannels. The process footer 106 provides a passageway for fluid to flow from the process microchannels in a rapid manner with a relatively high rate of flow. The reactant composition flows into the microchannel reactor 100 through the reactant header 104, as indicated by directional arrow 112. The reactant composition may be preheated prior to entering the reactant header 104. The reactant composition flows through the process microchannels in the microchannel reactor core 102 in contact with the catalyst and reacts to form the desired product. In one embodiment, the flow of reactant composition and product through the reactor core 102 is in a vertical direction, from the top of the reactor core 102 to its bottom. The product, and in one embodiment unreacted components from the reactant composition, flow from the reactor core 102 through the product footer 106, and out of product footer 106, as indicated by directional arrow 114. Although an advantage of the inventive process is that a high level of conversion of CO may be obtained with one pass through the process microchannels, in one embodiment, unreacted components from the reactant composition or a portion thereof may be recycled back through the process microchannels in contact with the catalyst. The unreacted components of the reactant composition being recycled through the process microchannels may be recycled any number of times, for example, one, two, three, four times, etc. A heat exchange fluid flows into heat exchange header 108, as indicated by directional arrow 116, and from heat exchange header 108 through the heat exchange channels in microchannel reactor core 102 to heat exchange footer 110, and out of heat exchange footer 110, as indicated by directional arrow 118. The microchannel reactor 100 is employed in conjunction with storage vessels, pumps, valves, flow control devices, and the like, which are not shown in the drawings, but would be apparent to those skilled in the art.

In one embodiment, the microchannel reactor core 102 may contain layers of process microchannels and heat exchange microchannels aligned side by side. An example of such microchannels layers is illustrated in FIG. 3. Referring to FIG. 3, process microchannel layers 130 and heat exchange microchannel layers 150 are stacked side by side to provide repeating unit 170. Microchannel layer 130 provides for the flow of reactant and product. Microchannel layer 150 provides for the flow of heat exchange fluid.

Microchannel layer 130 contains a plurality of microchannels 132 aligned in parallel, each process microchannel 132 extending in a vertical direction along the length of microchannel layer 130 from end 134 to end 136, the process microchannels 132 extending along the width of microchannel layer 130 from end 138 to end 140. Bonding strips 142 and 144 are positioned at the ends 138 and 140, respectively, of microchannel layer 130 to permit bonding of the microchannel layer 130 to the next adjacent heat exchange layers 150. A catalyst is contained within the process microchannels 132. The flow of reactant and product through the process microchannels 132 may be in the direction indicated by arrows 146 and 148. Each of the process microchannels 132 may have a cross section having any shape, for example, a square, rectangle, circle, semi-circle, etc. The internal height of each process microchannel 132 may be considered to be the vertical or horizontal distance or gap between the microchannel layer 130 and the next adjacent heat exchange layer 150. Each process microchannel 132 may have an internal height of up to about 10 mm, and in one embodiment up to about 6 mm, and in one embodiment up to about 4 mm, and in one embodiment up to about 2 mm. In one embodiment, the height may be in the range of about 0.05 to about 10 mm, and in one embodiment about 0.05 to about 6 mm, and in one embodiment about 0.05 to about 4 mm, and in one embodiment about 0.05 to about 2 mm. The width of each of these microchannels may be of any dimension, for example, up to about 3 meters, and in one embodiment about 0.01 to about 3 meters, and in one embodiment about 0.1 to about 3 meters. The length of each process microchannel 132 may be of any dimension, for example, up to about 10 meters, and in one embodiment about 0.2 to about 10 meters, and in one embodiment from about 0.2 to about 6 meters, and in one embodiment from 0.2 to about 3 meters.

Microchannel layer 150 contains a plurality of heat exchange microchannels 152 aligned in parallel, each heat exchange microchannel 152 extending horizontally along the width of microchannel layer 150 from end 154 to end 156, the heat exchange microchannels 152 extending along the length of microchannel layer 150 from end 158 to end 160 of microchannel layer 150. Bonding strips 162 and 164 are positioned at ends 154 and 156, respectively, of microchannel layer 150 to permit bonding of the microchannel layer 150 to the next adjacent process microchannel layers 130. The heat exchange fluid may flow through the heat exchange microchannels 152 in the direction indicated by arrows 166 and 168. The flow of heat exchange fluid in the direction indicated by arrows 166 and 168 is cross-current to the flow of reactant and product flowing through process microchannels 132 as indicated by arrows 146 and 148. Alternatively, the heat exchange microchannels 152 could be oriented to provide for flow of the heat exchange fluid along the width of the microchannel layer 150 from end 158 to end 160 or from end 160 to end 158. This would result in the flow of heat exchange fluid in a direction that would be cocurrent or counter-current to the flow of reactant and product through the process microchannels 132. Each of the heat exchange microchannels 152 may have a cross section having any shape, for example, a square, rectangle, circle, semi-circle, etc. The internal height of each heat exchange microchannel 152 may be considered to be the vertical or horizontal distance or gap between the heat exchange microchannel layer 150 and the next adjacent microchannel layer 130. Each of the heat exchange microchannels 152 may have an internal height of up to about 2 mm, and in one embodiment in the range of about 0.05 to about 2 mm, and in one embodiment about 0.05 to about 1.5 mm. The width of each of these microchannels may be of any dimension, for example, up to about 3 meters, and in one embodiment from about 0.01 to about 3 meters, and in one embodiment about 0.1 to about 3 meters. The length of each of the heat exchange microchannels 152 may be of any dimension, for example, up to about 10 meters, and in one embodiment from about 0.2 to about 10 meters, and in one embodiment from about 0.2 to about 6 meters, and in one embodiment from 0.2 to about 3 meters.

Alternatively, the process microchannels and heat exchange microchannels may be aligned as provided for in repeating unit 170a. Repeating unit 170a is illustrated in FIG. 4. Referring to FIG. 4, process microchannel 132 is positioned adjacent to microchannel layer 150 which contains heat exchange microchannels 152. A common wall 171 separates the process microchannel 132 from the heat exchange microchannel layer 150. A catalyst 172 is packed into the process microchannel 132. The reactant composition flows into and through the packed bed of catalyst 172 in process microchannel 132 in the direction indicated by directional arrow 146, contacts catalyst 172 and reacts to form the desired product. The product, and in one embodiment unreacted components from the reactant composition, exit the process microchannel 132 as indicated by directional arrow 148. Heat exchange fluid flows through the heat exchange microchannels 152 in a direction that is cross-current to the flow of reactant composition and product through the process microchannel 132.

Figure 5:
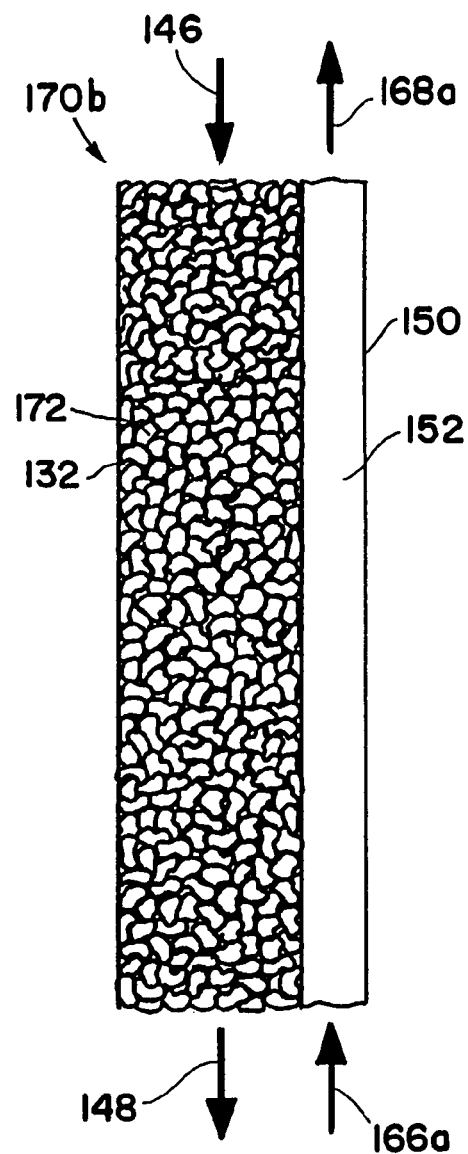
FIG. 5 is a schematic illustration of a process microchannel and an adjacent heat exchange channel that may be used in the microchannel reactor core of the microchannel reactor illustrated in FIG. 2, the flow of heat exchange fluid through the heat exchange channel being counter-current relative to the flow of reactant composition and product through the process microchannel.

Alternatively, the process microchannels and heat exchange microchannels may be aligned as provided for in repeating unit 170b. Repeating unit 170b illustrated in FIG. 5 is identical to the repeating unit 170a illustrated in FIG. 4 with the exception that the microchannel layer 150 is rotated 90° and the heat exchange fluid flowing through the heat exchange microchannel 152 flows in the direction indicated by direction arrows 166a and 168a which is countercurrent to the flow of reactant composition and product through the process microchannel 132. Alternatively, the heat exchange fluid could flow in the direction opposite to that indicated by directional arrows 166a and 168a and thereby provide for the flow of heat exchange fluid through the heat exchange microchannel 152 in a direction that would be cocurrent relative to the direction of reactant composition and product through the process microchannel 132.

Figure 6:
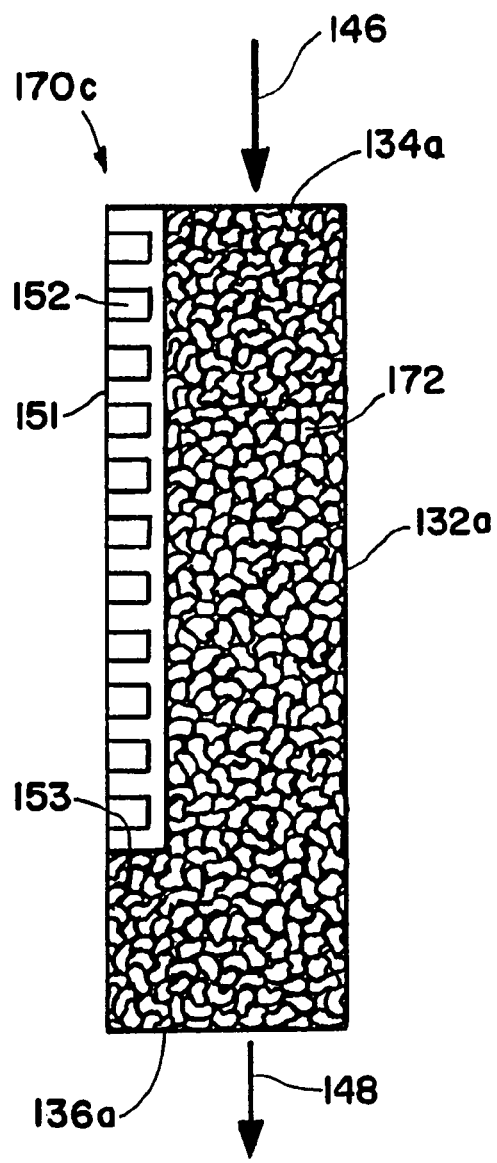
FIG. 6 is a schematic illustration of a process microchannel and an adjacent heat exchange zone that may be used in the microchannel reactor core of the microchannel reactor illustrated in FIG. 2, the heat exchange zone containing a plurality of heat exchange channels extending lengthwise at right angles relative to the lengthwise direction of the process microchannel, the heat exchange zone extending lengthwise in the same direction as the process microchannel and being positioned at or near the process microchannel entrance, the length of the heat exchange zone being less than the length of the process microchannel.

Alternatively, the process microchannels and heat exchange microchannels may be aligned as provided for in repeating unit 170c. Repeating unit 170c is illustrated in FIG. 6. Referring to FIG. 6, process microchannel 132a is positioned adjacent to heat exchange zone 151. Heat exchange zone 151 contains a plurality of heat exchange microchannels 152 aligned in parallel relative to one another, each heat exchange microchannel 152 extending lengthwise at a right angle relative to the lengthwise direction of the process microchannel 132a. Heat exchange zone 151 is shorter in length than process microchannel 132a. Heat exchange zone 151 extends lengthwise from or near the entrance 134a to process microchannel 132a to a point along the length of the process microchannel 132a short of the exit 136a to the process microchannel 132a. In one embodiment, the length of heat exchange zone 151 is up to about 100% of the length of process microchannel 132a, and in one embodiment the length of heat exchange zone 151 is from about 5 to about 100% of the length of the process microchannel 132a, and in one embodiment the length of the heat exchange zone 151 is from about 5 to about 50% of the length of the process microchannel 132a, and in one embodiment the length of the heat exchange zone 151 is from about 50% to about 100% of the length of the process microchannel 132a. The width of the process microchannel 132a is expanded or extended in the area downstream of the end 153 of the heat exchange zone 151. This arrangement provides the advantage of heat exchange (i.e., cooling) at or near the entrance 134a to the process microchannel 132a as well as to parts of the process microchannel 132a downstream from the entrance. A catalyst 172 is packed in the process microchannel 132a. The reactant composition flows into and through the packed bed of catalyst 172 in process microchannel 132a in the direction indicated by directional arrow 146, contacts catalyst 172 and reacts to form the desired product. The product, and in one embodiment unreacted components from the reactant composition, exit the process microchannel 132a, as indicated by directional arrow 148. Heat exchange fluid flows through the heat exchange microchannels 152 in a direction that is cross-current to the flow of reactant composition and product through the process microchannel 132a.

Figure 7:
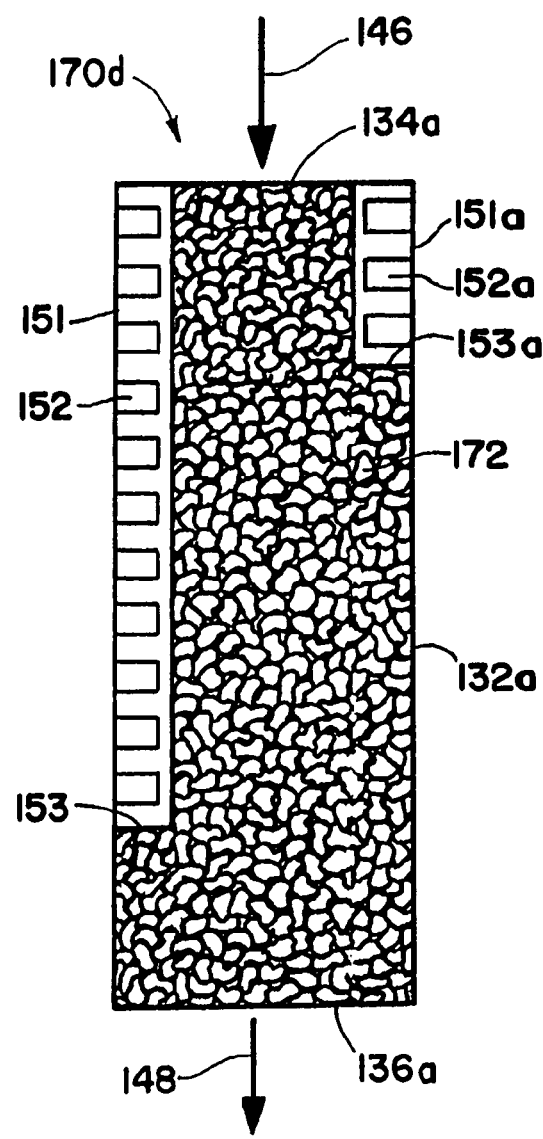
FIG. 7 is a schematic illustration of a process microchannel and first and second adjacent heat exchange zones that may be used in the microchannel reactor core of the microchannel reactor illustrated in FIG. 2, each of the heat exchange zones containing a plurality of heat exchange channels extending lengthwise at right angles relative to the lengthwise direction of the process microchannel, the heat exchange zone extending lengthwise in the same direction as the process microchannel and being positioned at or near the process microchannel entrance, the length of the first heat exchange zone being less than the length of the process microchannel, the length of the second heat exchange zone being less than the length of the first heat exchange zone.

Alternatively, the process microchannels and heat exchange microchannels may be aligned as provided for in repeating unit 170d. Repeating unit 170d, which is illustrated in FIG. 7, is identical to the repeating unit 170c illustrated in FIG. 6 with the exception that repeating unit 170d includes heat exchange zone 151a adjacent to process microchannel 132a on the opposite side of the process microchannel 132a from the heat exchange zone 151. Heat exchange zone 151a contains a plurality of parallel heat exchange microchannels 152a which are the same as or similar in size and design to the heat exchange microchannels 152 discussed above. Heat exchange zone 151a extends lengthwise from or near the entrance 134a to process microchannel 132a to a point along the length of process microchannel 132a short of the end 153 of heat exchange zone 151. The length of the heat exchange zone 151a may be shorter than the length of the heat exchange zone 151. In one embodiment, the length of the heat exchange zone 151a may be up to about 100% of the length of the process microchannel 132a, and in one embodiment the length of the heat exchange zone 151a is from about 5 to about 100% of the length of the process microchannel 132a, and in one embodiment the length of the heat exchange zone 151a is from about 5 to about 50% of the length of the process microchannel 132a, and in one embodiment the length of the heat exchange zone 151a is from about 50% to about 100% of the length of the process microchannel 132a. The width of the process microchannel 132a is expanded in the areas downstream of the ends 153 and 153a of the heat exchange zones 151 and 151a, respectively. This arrangement provides the advantage of heat exchange (i.e., cooling) at or near the entrance 134a to the process microchannel 132a as well to parts of the process microchannel 132a downstream from the entrance 134a. The use of the two heat exchange zones 151 and 151a allows for a relatively high level of heat exchange in the area of the process microchannel 132a near its entrance, and a relatively moderate heat exchange in the process microchannel downstream from about the end 153a of heat exchange zone 151a. Catalyst 172 is packed into the process microchannel 132a. The reactant composition flows into and through the packed bed of catalyst 172 in process microchannel 132a in the direction indicated by directional arrow 146, contacts the catalyst 172 and reacts to form the desired product. The product, and in one embodiment unreacted components from the reactant composition, exit the process microchannel 132a, as indicated by directional arrow 148. Heat exchange fluid flows through the heat exchange channels 151 and 151a in a direction which is cross-current to the flow of reactant composition and product through the process microchannel 132a.

The catalyst bed may be segregated into separate reaction zones in the process microchannels in the direction of flow through the process microchannels. In each reaction zone the length of one or more adjacent heat exchange zone(s) may vary in their dimensions. For example, in one embodiment, the length of the one or more adjacent heat exchange zones may be less than about 50% of the length of each reaction zone. Alternatively, the one or more heat exchange zones may have lengths that are more than about 50% of the length of each reaction zone up to about 100% of the length of each reaction zone.

The number of microchannels in each of the microchannel layers 130 and 150 may be any desired number, for example, one, two, three, four, five, six, eight, ten, hundreds, thousands, tens of thousands, hundreds of thousands, millions, etc. Similarly, the number of repeating units 170 (or 170a through 170d) of microchannel layers in the microchannel reactor core 102 may be any desired number, for example, one, two, three, four, six, eight, ten, hundreds, thousands, etc.

The microchannel reactor 100, including the microchannel reactor core 102, may be constructed of any material that provides sufficient strength, dimensional stability and heat transfer characteristics for carrying out the inventive process. Examples of suitable materials include steel (e.g., stainless steel, carbon steel, and the like), aluminum, titanium, nickel, and alloys of any of the foregoing metals, plastics (e.g., epoxy resins, UV cured resins, thermosetting resins, and the like), monel, inconel, ceramics, glass, composites, quartz, silicon, or a combination of two or more thereof. The microchannel reactor may be fabricated using known techniques including wire electrodischarge machining, conventional machining, laser cutting, photochemical machining, electrochemical machining, molding, water jet, stamping, etching (for example, chemical, photochemical or plasma etching) and combinations thereof. The microchannel reactor may be constructed by forming layers or sheets with portions removed that allow flow passage. A stack of sheets may be assembled via diffusion bonding, laser welding, diffusion brazing, and similar methods to form an integrated device. The microchannel reactor has appropriate manifolds, valves, conduit lines, etc. to control flow of the reactant composition and product, and flow of the heat exchange fluid. These are not shown in the drawings, but can be readily provided by those skilled in the art.

The reactant composition comprises a mixture of $H_2$ and CO. This mixture may be referred to as synthesis gas or syngas. The molar ratio of $H_2$ to CO may range from about 0.8 to about 10, and in one embodiment about 0.8 to about 5, and in one embodiment about 1 to about 3, and in one embodiment about 1.5 to about 3, and in one embodiment about 1.8 to about 2.5, and in one embodiment about 1.9 to about 2.2, and in one embodiment about 2.05 to about 2.10. The reactant composition may also contain $CO_2$ and/or $H_2O$, as well as light hydrocarbons of 1 to about 4 carbon atoms, and in one embodiment 1 to about 2 carbon atoms. The reactant composition may contain from about 5 to about 45% by volume CO, and in one embodiment about 5 to about 20% by volume CO; and about 55 to about 95% by volume $H_2$, and in one embodiment about 80 to about 95% by volume $H_2$. The concentration of $CO_2$ in the reactant composition may be up to about 60% by volume, and in one embodiment about 5 to about 60% by volume, and in one embodiment about 5 to about 40% by volume. The concentration of $H_2O$ in the reactant composition may be up to about 80% by volume, and in one embodiment about 5 to about 80% by volume, and in one embodiment about 5 to about 50% by volume. The concentration of light hydrocarbons in the reactant composition may be up to about 80% by volume, and in one embodiment about 1 to about 80% by volume, and in one embodiment about 1 to about 50% by volume. The reactant composition may comprise recycled gaseous products formed during the inventive process. The reactant composition may comprise a stream (e.g., a gaseous stream) from another process such as a steam reforming process (product stream with $H_2/CO$ mole ratio of about 3), a partial oxidation process (product stream with $H_2/CO$ mole ration of about 2), an autothermal reforming process (product stream with $H_2/CO$ mole ratio of about 2.5), a $CO_2$ reforming process (product stream with $H_2/CO$ mole ratio of about 1), a coal gassification process (product stream with $H_2/CO$ mole ratio of about 1), and combinations thereof.

The presence of contaminants such as sulfur, nitrogen, halogen, selenium, phosphorus, arsenic, and the like, in the reactant composition may be undesirable. Thus, in one embodiment of the invention, the foregoing contaminants may be removed from the reactant composition or have their concentrations reduced prior to conducting the inventive process. Techniques for removing these contaminants are well known to those of skill in the art. For example, ZnO guardbeds may be used for removing sulfur impurities. In one embodiment, the contaminant level in the reactant composition may be at a level of up to about 5% by volume, and in one embodiment up to about 1% by volume, and in one embodiment up to about 0.1% by volume, and in one embodiment up to about 0.05% by volume.

The heat exchange fluid may be any fluid. These include air, steam, liquid water, gaseous nitrogen, other gases including inert gases, carbon monoxide, molten salt, oils such as mineral oil, and heat exchange fluids such as Dowtherm A and Therminol which are available from Dow-Union Carbide.

The heat exchange fluid may comprise a stream of the reactant composition. This can provide process pre-heat and increase in overall thermal efficiency of the process.

In one embodiment, the heat exchange channels comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range of about 200° C. to about 300° C. is another example of such an endothermic process. The incorporation of a simultaneous endothermic reaction to provide an improved heat sink may enable a typical heat flux of roughly an order of magnitude above the convective cooling heat flux. The use of simultaneous exothermic and endothermic reactions to exchange heat in a microchannel reactor is disclosed in U.S. patent application Ser. No. 10/222,196, filed Aug. 15, 2002, which is incorporated herein by reference.

In one embodiment, the heat exchange fluid undergoes a partial or full phase change as it flows through the heat exchange channels. This phase change provides additional heat removal from the process microchannels beyond that provided by convective cooling. For a liquid heat exchange fluid being vaporized, the additional heat being transferred from the process microchannels would result from the latent heat of vaporization required by the heat exchange fluid. An example of such a phase change would be an oil or water that undergoes boiling. In one embodiment, about 50% by weight of the heat exchange fluid is vaporized.

The heat flux for convective heat exchange in the microchannel reactor may range from about 1 to about 25 watts per square centimeter of surface area of the process microchannels ($W/cm^2$) in the microchannel reactor, and in one embodiment from about 1 to about 10 $W/cm^2$. The heat flux for phase change or simultaneous endothermic reaction heat exchange may range from about 1 to about 250 $W/cm^2$, and in one embodiment from about 1 to about 100 $W/cm^2$, and in one embodiment from about 1 to about 50 $W/cm^2$, and in one embodiment from about 1 to about 25 $W/cm^2$, and in one embodiment from about 1 to about 10 $W/cm^2$.

The cooling of the process microchannels during the inventive process, in one embodiment, is advantageous for controlling selectivity towards the main or desired product due to the fact that such added cooling reduces or eliminates the formation of undesired by-products from undesired parallel reactions with higher activation energies. As a result of this cooling, in one embodiment, the temperature of the reactant composition at the entrance to the process microchannels may be within about 200° C., and in one embodiment within about 150° C., and in one embodiment within about 100° C., and in one embodiment within about 50° C., and in one embodiment within about 25° C., and in one embodiment within about 10° C., of the temperature of the product (or mixture of product and unreacted reactants) at the exit of the process microchannels.

The catalyst may comprise any Fischer-Tropsch catalyst. The catalyst comprises at least one catalytically active metal or oxide thereof. In one embodiment, the catalyst further comprises a catalyst support. In one embodiment, the catalyst further comprises at least one promoter. The catalytically active metal may comprise Co, Fe, Ni, Ru, Re, Os, or a combination of two or more thereof. The support material may comprise alumina, zirconia, silica, aluminum fluoride, fluorided alumina, bentonite, ceria, zinc oxide, silica-alumina, silicon carbide, a molecular sieve, or a combination of two or more thereof. The support material may comprise a refractory oxide. The promoter may comprise a Group IA, IIA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. Examples of catalysts that may be used include those disclosed in U.S. Pat. Nos. 4,585,798; 5,036,032; 5,733,839; 6,075,062; 6,136,868; 6,262,131B1; 6,353,035B2; 6,368,997B2; 6,476,085B2; 6,451,864B1; 6,490,880B1; 6,537,945B2; 6,558,634B1; and U.S. Patent Publications 2002/0028853A1; 2002/0188031A1; and 2003/0105171A1; these patents and patent publications being incorporated herein by reference for their disclosures of Fischer-Tropsch catalysts and methods for preparing such catalysts.

In one embodiment, the catalyst comprises Co, and optionally a co-catalyst and/or promoter, supported on a support wherein the Co loading is at least about 5% by weight, and in one embodiment at least about 10% by weight, and in one embodiment at least about 15% by weight, and in one embodiment at least about 20% by weight, and in one embodiment at least about 25% by weight, and in one embodiment at least about 28% by weight, and in one embodiment at least about 30% by weight, and in one embodiment at least about 32% by weight, and in one embodiment at least about 35% by weight, and in one embodiment at least about 40% by weight. In one embodiment, the Co loading may be from about 5 to about 50% by weight, and in one embodiment about 10 to about 50% by weight, and in one embodiment about 15 to about 50% by weight, and in one embodiment about 20 to about 50% by weight, and in one embodiment about 25 to about 50% by weight, and in one embodiment about 28 to about 50% by weight, and in one embodiment about 30 to about 50% by weight, and in one embodiment about 32 to about 50% by weight. The metal dispersion for the catalytically active metal (i.e., Co, and optionally co-catalyst and/or promoter) of the catalyst may range from about 1 to about 30%, and in one embodiment about 2 to about 20%, and in one embodiment about 3 to about 20%. The co-catalyst may be Fe, Ni, Ru, Re, Os, or an oxide thereof, or a mixture of two or more thereof. The promoter may be a Group IA, HA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. The co-catalyst may be employed at a concentration of up to about 10% by weight based on the total weight of the catalyst (i.e., the weight of catalyst, co-catalyst, promoter and support), and in one embodiment about 0.1 to about 5% by weight. The promoter may be employed at a concentration of up to about 10% by weight based on the total weight of the catalyst, and in one embodiment about 0.1 to about 5% by weight.

In one embodiment, the catalyst may comprise Co supported by alumina; the loading of Co being at least about 25% by weight, and in one embodiment at least about 28% by weight, and in one embodiment at least about 30% by weight, and in one embodiment at least about 32% by weight; and the Co dispersion is at least about 3%, and in one embodiment at least about 5%, and in one embodiment at least about 7%.

In one embodiment, the catalyst may comprise a composition represented by the formula $$CoM^1_a M^2_b O_x$$

wherein: $M^1$ is Fe, Ni, Ru, Re, Os or a mixture thereof, and in one embodiment $M^1$ is Ru or Re or a mixture thereof; $M^2$ is Li, B, Na, K, Rb, Cs, Mg, Ca, Sr, Ba, Sc, Y, La, Ac, Ti, Zr, La, Ac, Ce or Th, or a mixture of two or more thereof; a is a number in the range of zero to about 0.5, and in one embodiment zero to about 0.2; b is a number in the range of zero to about 0.5, and in one embodiment zero to about 0.1; and x is the number of oxygens needed to fulfill the valency requirements of the elements present.

In one embodiment, the catalyst used in the inventive process may be made using multiple impregnation steps wherein intercalcination steps are conducted between each impregnation step. The use of such a procedure, at least in one embodiment, allows for the formation of catalysts with levels of loading of catalytic metal and optionally promoter that are higher than with procedures wherein such intercalcination steps are not employed. In one embodiment, a catalytic metal (e.g., Co) and optionally co-catalyst (e.g., Re or Ru) and/or promoter is loaded on a support (e.g., $Al_2O_3$) using the following sequence of steps: (A) impregnating the support with a composition comprising a catalytic metal and optionally a co-catalyst and/or promoter to provide an intermediate catalytic product; (B) calcining the intermediate catalytic product formed in step (A); (C) impregnating the calcined intermediate product formed in (B) with another composition comprising a catalytic metal and optionally a co-catalyst and/or promoter, to provide another intermediate catalytic product; and (D) calcining the another intermediate catalytic product formed in step (C) to provide the desired catalyst product. The catalytic metal and optional co-catalyst and/or promoter may be impregnated on the support using an incipient wetness impregnation process. Steps (C) and (D) may be repeated one or more additional times until the desired loading of catalytic metal, and optional co-catalyst and/or promoter, is achieved. The composition comprising the catalytic metal may be a nitrate solution of the metal, for example, a cobalt nitrate solution. The process may be continued until the catalytic metal (i.e., Co) achieves a loading level of about 20% by weight or more, and in one embodiment about 25% by weight or more, and in one embodiment about 28% by weight or more, and in one embodiment about 30% by weight or more, and in one embodiment about 32% by weight or more, and in one embodiment about 35% by weight or more, and in one embodiment about 37% by weight or more, and in one embodiment about 40% by weight or more. Each of the calcination steps may comprise heating the catalyst at a temperature in the range of about 100° C. to about 500° C., and in one embodiment about 100° C. to about 400° C., and in one embodiment about 250 to about 350° C. for about 0.5 to about 100 hours, and in one embodiment about 0.5 to about 24 hours, and in one embodiment about 2 to about 3 hours. The temperature may be ramped to the calcination temperature at a rate of about 1-20° C./min. The calcination steps may be preceded by drying steps wherein the catalyst is dried at a temperature of about 75 to about 200° C., and in one embodiment about 75° C. to about 150° C., for about 0.5 to about 100 hours, and in one embodiment about 0.5 to about 24 hours. In one embodiment, the catalyst may be dried for about 12 hours at about 90° C. and then at about 110-120° C. for about 1-1.5 hours, the temperature being ramped from 90° C. to 110-120° C. at a rate of about 0.5-1° C./min.

The catalyst used in a microchannel reactor may have any size and geometric configuration that fits within the process microchannels. The catalyst may be in the form of particulate solids (e.g., pellets, powder, fibers, and the like) having a median particle diameter of about 1 to about 1000 μm (microns), and in one embodiment about 10 to about 500 μm, and in one embodiment about 25 to about 250 μm. In one embodiment, the catalyst is in the form of a fixed bed of particulate solids.

In one embodiment, the catalyst is in the form of a fixed bed of particulate solids, the median particle diameter of the catalyst particulate solids is relatively small, and the length of each process microchannel is relatively short. The median particle diameter may be in the range of about 1 to about 1000 μm, and in one embodiment about 10 to about 500 μm, and the length of each process microchannel may be in the range of up to about 500 cm, and in one embodiment about 10 to about 500 cm, and in one embodiment about 50 to about 300 cm.

The catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The catalyst may be supported on a honeycomb structure.

Figure 8:
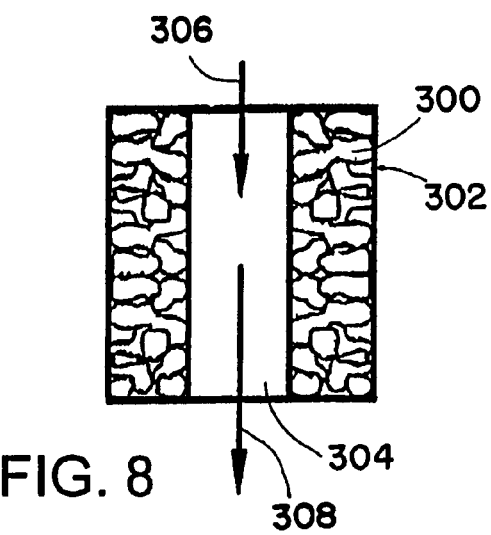
FIG. 8 is a schematic illustration of a process microchannel that may be used with the inventive process, the process microchannel containing a catalyst having a flow-by configuration.

The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow. An example of a flow-by structure is illustrated in FIG. 8. In FIG. 8, the catalyst 300 is contained within process microchannel 302. An open passage way 304 permits the flow of fluid through the process microchannel 302 in contact with the catalyst 300 as indicated by arrows 306 and 308.

Figure 9:
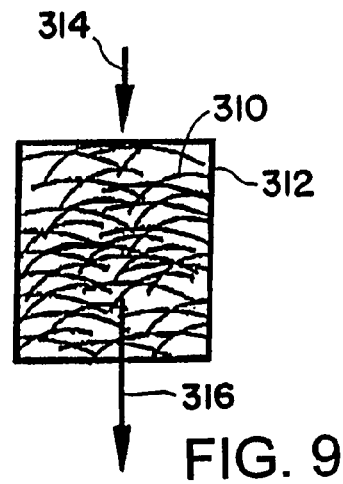
FIG. 9 is a schematic illustration of a process microchannel that may be used with the inventive process, the process microchannel containing a catalyst having a flow-through configuration.

The catalyst may be supported on a flow-through support structure such as a foam, wad, pellet, powder, or gauze. An example of a flow-through structure is illustrated in FIG. 9. In FIG. 9, the flow-through catalyst 310 is contained within process microchannel 312 and the fluid flows through the catalyst 310 as indicated by arrows 314 and 316.

The support structure for a flow-through catalyst may be formed from a material comprising silica gel, foamed copper, sintered stainless steel fiber, steel wool, alumina, poly(methyl methacrylate), polysulfonate, poly(tetrafluoroethylene), iron, nickel sponge, nylon, polyvinylidene difluoride, polypropylene, polyethylene, polyethylene ethylketone, polyvinyl alcohol, polyvinyl acetate, polyacrylate, polymethylmethacrylate, polystyrene, polyphenylene sulfide, polysulfone, polybutylene, or a combination of two or more thereof. In one embodiment, the support structure may be made of a heat conducting material, such as a metal, to enhance the transfer of heat away from the catalyst.

The catalyst may be directly washcoated on the interior walls of the process microchannels, grown on the walls from solution, or coated in situ on a fin structure. The catalyst may be in the form of a single piece of porous contiguous material, or many pieces in physical contact. In one embodiment, the catalyst may be comprised of a contiguous material and has a contiguous porosity such that molecules can diffuse through the catalyst. In this embodiment, the fluids flow through the catalyst rather than around it. In one embodiment, the cross-sectional area of the catalyst occupies about 1 to about 99%, and in one embodiment about 10 to about 95% of the cross-sectional area of the process microchannels. The catalyst may have a surface area, as measured by BET, of greater than about 0.5 $m^2/g$, and in one embodiment greater than about 2 $m^2/g$.

The catalyst may comprise a porous support, an interfacial layer on the porous support, and a catalyst material on the interfacial layer. The interfacial layer may be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes.

The porous support may have a porosity of at least about 5% as measured by mercury porosimetry and an average pore size (sum of pore diameters divided by number of pores) of about 1 to about 1000 µm. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may be comprised of $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. $\alpha$-$Al_2O_3$ provides the advantage of excellent resistance to oxygen diffusion. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be $TiO_2$. The second sublayer may be $\alpha$-$Al_2O_3$ which is placed upon the $TiO_2$. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 µm, and in one embodiment about 0.05 to about 5 µm.

In one embodiment of the invention, adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may be comprised of a metal oxide. Examples of metal oxides that may be used include $\gamma$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. Usually, however, the interfacial layer is used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 µm, and in one embodiment from about 1 to about 50 µm. The interfacial layer may be either crystalline or amorphous. The interfacial layer may have a BET surface area of at least about 1 $m^2/g$.

The catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i.e., interfacial layer) surface, in crevices in the support layer, and in open pores in the support layer.

Figure 10:
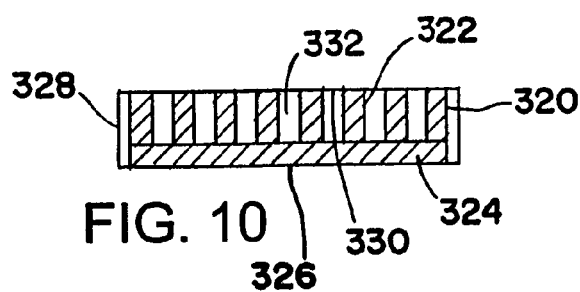
FIG. 10 is a schematic illustration of a process microchannel that may be used in the inventive process, the process microchannel containing a fin assembly comprising a plurality of fins, a catalyst being supported by the fins.
Figure 11:
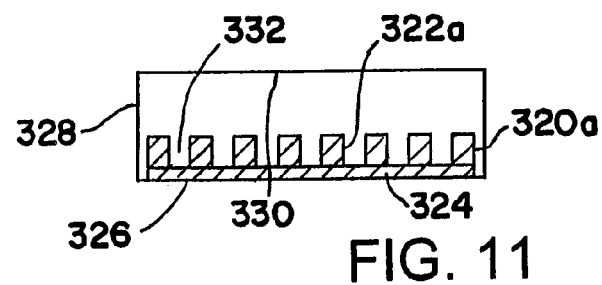
FIG. 11 illustrates an alternate embodiment of the process microchannel and fin assembly illustrated in FIG. 10.
Figure 12:
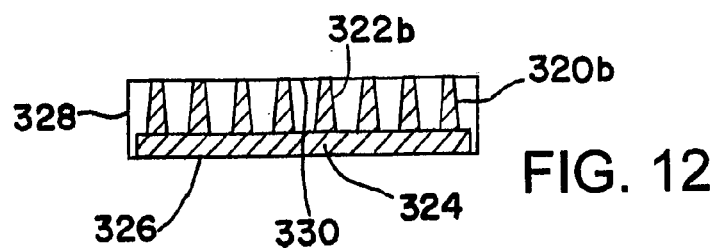
FIG. 12 illustrates another alternate embodiment of the process microchannel and fin assembly illustrated in FIG. 10.

The catalyst may be supported on an assembly of one or more fins positioned within the process microchannels. Examples are illustrated in FIGS. 10-12. Referring to FIG. 10, fin assembly 320 includes fins 322 which are mounted on fin support 324 which overlies base wall 326 of process microchannel 328. The fins 322 project from the fin support 324 into the interior of the process microchannel 328. The fins 322 extend to and may contact the interior surface of upper wall 330 of process microchannel 328. Fin channels 332 between the fins 322 provide passage ways for fluid to flow through the process microchannel 328 parallel to its length. Each of the fins 322 has an exterior surface on each of its sides, this exterior surface provides a support base for the catalyst. With the inventive process, the reactant composition flows through the fin channels 332, contacts the catalyst supported on the exterior surface of the fins 322, and reacts to form the product. The fin assembly 320*a* illustrated in FIG. 11 is similar to the fin assembly 320 illustrated in FIG. 10 except that the fins 322*a* do not extend all the way to the interior surface of the upper wall 330 of the microchannel 328. The fin assembly 320*b* illustrated in FIG. 12 is similar to the fin assembly 320 illustrated in FIG. 10 except that the fins 322*b* in the fin assembly 320*b* have cross sectional shapes in the form of trapezoids. Each of the fins may have a height ranging from about 0.02 mm up to the height of the process microchannel 328, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 328, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 328 may range from about 1 to about 50 fins per centimeter of width of the process microchannel 328, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 10 or 11, or a trapezoid as illustrated in FIG. 12. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof. The fin assembly may be made of an $Al_2O_3$ forming material such as an alloy comprising Fe, Cr, Al and Y, or a $Cr_2O_3$ forming material such as an alloy of Ni, Cr and Fe.

In one embodiment, the catalyst may be regenerated. This may be done by flowing a regenerating fluid through the process microchannels in contact with the catalyst. The regenerating fluid may comprise hydrogen or a diluted hydrogen stream. The diluent may comprise nitrogen, argon, helium, methane, carbon dioxide, steam, or a mixture of two or more thereof. The regenerating fluid may flow from the header 104 through the process microchannels and to the footer 106, or in the opposite direction from the footer 106 through the process microchannels to the header 104. The temperature of the regenerating fluid may be from about 50 to about 400° C., and in one embodiment about 200 to about 350° C. The pressure within the process microchannels during this regeneration step may range from about 1 to about 40 atmospheres, and in one embodiment about 1 to about 20 atmospheres, and in one embodiment about 1 to about 5 atmospheres. The residence time for the regenerating fluid in the process microchannels may range from about 0.01 to about 1000 seconds, and in one embodiment about 0.1 second to about 100 seconds.

In one embodiment, the process microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region is laminar. Bulk flow regions within each process microchannel may have a cross-sectional area of about 0.05 to about 10,000 $mm^2$, and in one embodiment about 0.05 to about 5000 $mm^2$, and in one embodiment about 0.1 to about 2500 $mm^2$. The bulk flow regions may comprise from about 5% to about 95%, and in one embodiment about 30% to about 80% of the cross-section of the process microchannels.

The contact time of the reactants with the catalyst within the process microchannels may range up to about 2000 milliseconds (ms), and in one embodiment from about 10 ms to about 1000 ms, and in one embodiment about 20 ms to about 500 ms. In one embodiment, the contact time may range up to about 300 ms, and in one embodiment from about 20 to about 300 ms, and in one embodiment from about 50 to about 150 ms, and in one embodiment about 75 to about 125 ms, and in one embodiment about 100 ms.

The space velocity (or gas hourly space velocity (GHSV)) for the flow of the reactant composition and product through the process microchannels may be at least about 1000 $hr^{-1}$ (normal liters of feed/hour/liter of volume within the process microchannels) or at least about 800 ml feed/(g catalyst) (hr). The space velocity may range from about 1000 to about 1,000,000 $hr^{-1}$, or from about 800 to about 800,000 ml feed/(g catalyst) (hr). In one embodiment, the space velocity may range from about 10,000 to about 100,000 $hr^{-1}$, or about 8,000 to about 80,000 ml feed/(g catalyst) (hr).

The temperature of the reactant composition entering the process microchannels may range from about 150° C. to about 270° C., and in one embodiment about 180° C. to about 250° C., and in one embodiment about 180° C. to about 220° C.

The temperature of the reactant composition and product within the process microchannels may range from about 200° C. to about 300° C., and in one embodiment from about 220° C. to about 270° C., and in one embodiment from about 220° C. to about 250° C.

The temperature of the product exiting the process microchannels may range from about 200° C. to about 300° C., and in one embodiment about 220° C. to about 270° C., and in one embodiment about 220° C. to about 250° C.

The pressure within the process microchannels may be at least about 5 atmospheres, and in one embodiment at least about 10 atmospheres, and in one embodiment at least about 15 atmospheres, and in one embodiment at least about 20 atmospheres, and in one embodiment at least about 25 atmospheres, and in one embodiment at least about 30 atmospheres. In one embodiment the pressure may range from about 5 to about 50 atmospheres, and in one embodiment from about 10 to about 50 atmospheres, and in one embodiment from about 10 to about 30 atmospheres, and in one embodiment from about 10 to about 25 atmospheres, and in one embodiment from about 15 to about 25 atmospheres.

The pressure drop of the reactants and/or products as they flow through the process microchannels may range up to about 10 atmospheres per meter of length of the process microchannel (atm/m), and in one embodiment up to about 5 atm/m, and in one embodiment up to about 3 atm/m.

The reactant composition entering the process microchannels is typically in the form of a vapor, while the product exiting the process microchannels may be in the form of a vapor, a liquid, or a mixture of vapor and liquid. The Reynolds Number for the flow of vapor through the process microchannels may be in the range of about 10 to about 4000, and in one embodiment about 100 to about 2000. The Reynolds Number for the flow of liquid through the process microchannels may be about 10 to about 4000, and in one embodiment about 100 to about 2000.

The heat exchange fluid entering the heat exchange channels may be at a temperature of about 150° C. to about 300° C., and in one embodiment about 150° C. to about 270° C. The heat exchange fluid exiting the heat exchange channels may be at a temperature in the range of about 220° C. to about 270° C., and in one embodiment about 230° C. to about 250° C. The residence time of the heat exchange fluid in the heat exchange channels may range from about 50 to about 5000 ms, and in one embodiment about 100 to about 1000 ms. The pressure drop for the heat exchange fluid as it flows through the heat exchange channels may range up to about 10 atm/m, and in one embodiment from about 1 to about 10 atm/m, and in one embodiment from about 2 to about 5 atm/m. The heat exchange fluid may be in the form of a vapor, a liquid, or a mixture of vapor and liquid. The Reynolds Number for the flow of vapor through the heat exchange channels may be from about 10 to about 4000, and in one embodiment about 100 to about 2000. The Reynolds Number for the flow of liquid through heat exchange channels may be from about 10 to about 4000, and in one embodiment about 100 to about 2000.

The conversion of CO may be about 40% or higher per cycle, and in one embodiment about 50% or higher, and in one embodiment about 55% or higher, and in one embodiment about 60% or higher, and in one embodiment about 65% or higher, and in one embodiment about 70% or higher. The term "cycle" is used herein to refer to a single pass of the reactants through the process microchannels.

The selectivity to methane in the product may be about 25% or less, and in one embodiment about 20% or less, and in one embodiment about 15% or less, and in one embodiment about 12% or less, and in one embodiment about 10% or less.

The yield of product may be about 25% or higher per cycle, and in one embodiment about 30% or higher, and in one embodiment about 40% or higher per cycle.

In one embodiment, the conversion of CO is at least about 50%, the selectivity to methane is about 15% or less, and the yield of product is at least about 35% per cycle.

The product formed by the inventive process may comprise a gaseous product fraction and a liquid product fraction. The gaseous product fraction may include hydrocarbons boiling below about 350° C. at atmospheric pressure (e.g., tail gases through middle distillates). The liquid product fraction (the condensate fraction) may include hydrocarbons boiling above about 350° C. (e.g., vacuum gas oil through heavy paraffins).

The product fraction boiling below about 350° C. may be separated into a tail gas fraction and a condensate fraction, e.g., normal paraffins of about 5 to about 20 carbon atoms and higher boiling hydrocarbons, using, for example, a high pressure and/or lower temperature vapor-liquid separator, or low pressure separators or a combination of separators. The fraction boiling above about 350° C. (the condensate fraction) may be separated into a wax fraction boiling in the range of about 350° C. to about 650° C. after removing one or more fractions boiling above about 650° C. The wax fraction may contain linear paraffins of about 20 to about 50 carbon atoms with relatively small amounts of higher boiling branched paraffins. The separation may be effected using fractional distillation.

The product formed by the inventive process may include methane, wax and other heavy high molecular weight products. The product may include olefins such as ethylene, normal and iso-paraffins, and combinations thereof. These may include hydrocarbons in the distillate fuel ranges, including the jet or diesel fuel ranges.

Branching may be advantageous in a number of end-uses, particularly when increased octane values and/or decreased pour points are desired. The degree of isomerization may be greater than about 1 mole of isoparaffin per mole of n-paraffin, and in one embodiment about 3 moles of isoparaffin per mole of n-paraffin. When used in a diesel fuel composition, the product may comprise a hydrocarbon mixture having a cetane number of at least about 60.

Commercially, higher molecular weight products, for example waxes, may either be isolated and used directly, or reacted to form lower molecular weight products. For example, high molecular weight products may be hydrocracked to provide lower molecular weight products, increasing the yield of liquid combustible fuels. Hydrocracking refers to a catalytic process, usually carried out in the presence of free hydrogen, in which the cracking of the larger hydrocarbon molecules is a primary purpose of the operation. Catalysts used in carrying out hydrocracking operations are well known in the art; see, for example, U.S. Pat. Nos. 4,347,121 and 4,810,357, which are incorporated herein by reference, for their descriptions of hydrotreating, hydrocracking, and catalysts used in each process. The product formed by the inventive process may be further processed to form a lubricating base oil or diesel fuel. For example, the product made by the inventive process may be hydrocracked and then subjected to distillation and/or catalytic isomerization to provide a lubricating base oil, diesel fuel, and the like.

The hydrocarbon products made by the inventive process may be hydroisomerized using the process disclosed in U.S. Pat. Nos. 6,103,099 or 6,180,575; hydrocracked and hydroisomerized using the process disclosed in U.S. Pat. Nos. 4,943,672 or 6,096,940; dewaxed using the process disclosed in U.S. Pat. No. 5,882,505; or hydroisomerized and dewaxed using the process disclosed in U.S. Pat. Nos. 6,013,171, 6,080,301 or 6,165,949. These patents are incorporated herein by reference for their disclosures of processes for treating Fischer-Tropsch synthesized hydrocarbons and the resulting products made from such processes.

EXAMPLE 1

A multiple impregnation process is used to form a Co/Re catalyst supported on $Al_2O_3$. Separate batches of impregnation solutions (with different concentrations) are used for each impregnation. The composition of each impregnation solution is as follows: Impregnation solution A contains 31.0% by weight cobalt nitrate and 2.8% by weight perrhenic acid. Impregnation solution B contains 29.8% by weight cobalt nitrate and 2.7% by weight perrhenic acid. Impregnation solution C contains 38.7% by weight cobalt nitrate and 3.5% by weight perrhenic acid. Impregnation solution D contains 40.7% by weight cobalt nitrate and 3.6% by weight perrhenic acid. The following sequence of steps is used.

(1) The $Al_2O_3$ support (1.0 gram) is calcined at 650° C. for 1 hour. The support has a Brunauer-Emmett-Teller (BET) surface area of 200 $m^2/g$ and a Barrett-Joyner-Halenda (BJH) pore volume of 0.69 $cm^3/g$.

(2) A first impregnation is conducted using 0.7 ml of impregnation solution A to provide a total loading of 7.9% by weight Co and 1.2% by weight Re.

(3) The catalyst is dried at 90° C. for 12 hours, and then calcined by increasing the temperature to 250° C. at a rate of 5° C. per minute and then maintaining the temperature at 250° C. for 2 hours.

(4) The catalyst from step (3) has a BET surface area of 183 $m^2/g$ and a BJH pore volume of 0.57 $cm^3/g$.

(5) A second impregnation is conducted using 0.57 ml of impregnation solution B to provide a total loading of 13% by weight Co and 2.0% by weight Re.

(6) The catalyst is dried at 90° C. for 12 hours, and then calcined by increasing the temperature to 250° C. at a rate of 5° C. per minute and then maintaining the temperature at 250° C. for 2 hours.

(7) The catalyst from step (6) has a BET surface are of 162 $m^2/g$, and a BJH pore volume of 0.48 $cm^3/g$.

(8) A third impregnation is conducted using 0.48 ml of impregnation solution C to provide a total loading of 19% by weight Co and 2.9% by weight Re.

(9) The catalyst is dried at 90° C. for 12 hours, and then calcined by increasing the temperature to 250° C. at a rate of 5° C. per minute and then maintaining the temperature at 250° C. for 2 hours.

(10) The catalyst from step (9) has a BET surface area of 144 $m^2/g$ and a BJH pore volume of 0.41 $cm^3/g$.

(11) A fourth impregnation is conducted using 0.41 ml of impregnation solution D with the result being a total loading of 25% by weight Co and 3.6% by weight Re.

(12) The catalyst is dried at 90° C. for 12 hours, and then calcined by increasing the temperature to 250° C. at a rate of 5° C. per minute and then maintaining the temperature at 250° C. for 2 hours.

(13) A chemisorption test is conducted with the results being 6.2% Co dispersion.

Figure 13:
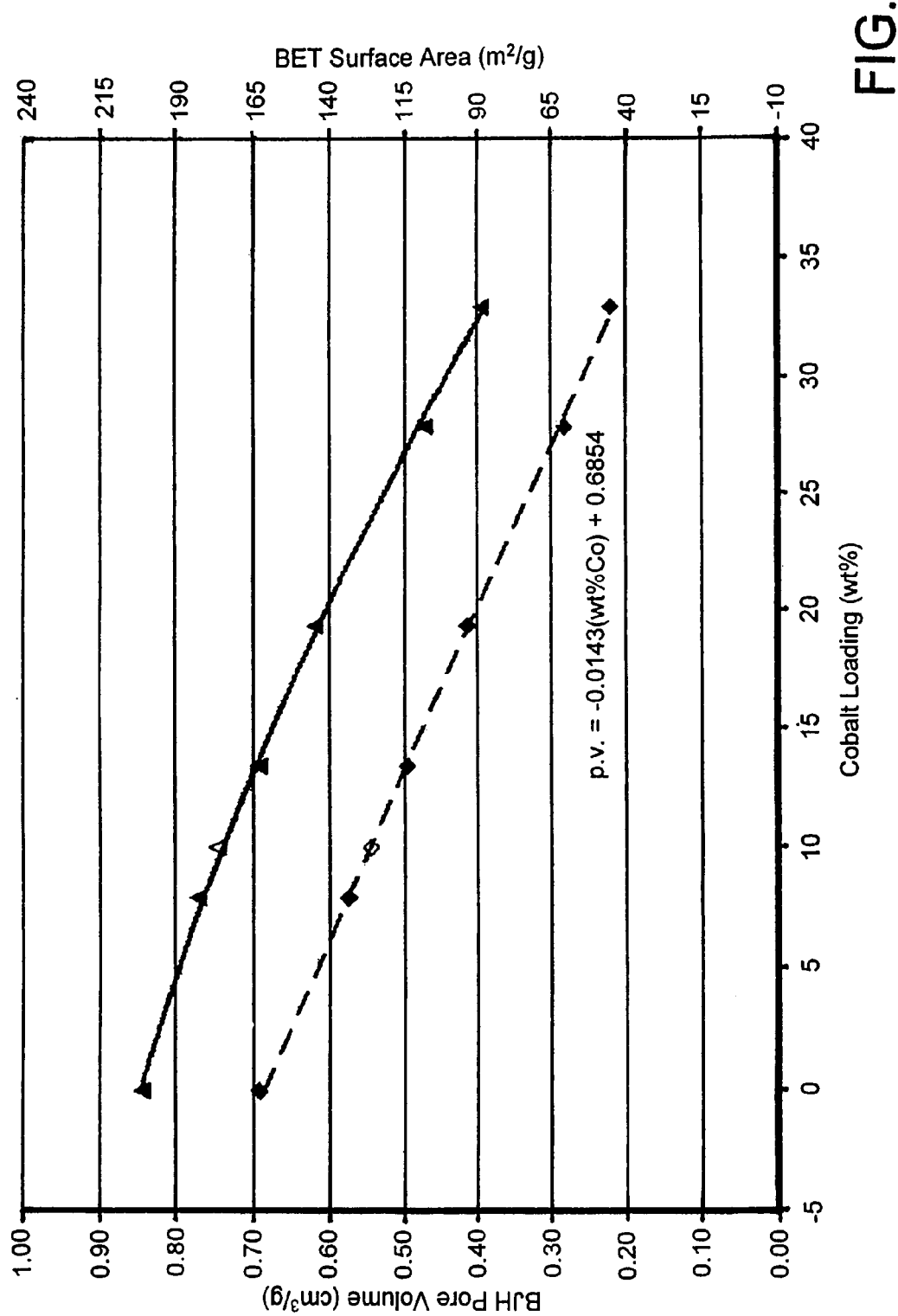
FIG. 13 is a plot of pore volume and surface area versus cobalt loading obtained in Example 1.

The pore volume and surface area data collected in the above-indicated synthesis are disclosed in FIG. 13.

EXAMPLE 2

A single batch of impregnation solution is used for the following impregnations. The impregnation solution contains a saturated solution of cobalt nitrate to which perrhenic acid is added. The following procedure is used.

(1) The $Al_2O_3$ support (1 gram) is calcined at 650° C. for 1 hour. The support has a BET surface area of 200 $m^2/g$ and a BJH pore volume of 0.69 $cm^3/g$.

(2) A first impregnation is conducted using 0.69 ml of impregnation solution to provide a total loading of 11.0% by weight Co and 1.7% by weight Re.

(3) The catalyst is dried at 90° C. for 12 hours, and then calcined by increasing the temperature to 250° C. at a rate of 5° C. per minute and then maintaining the temperature at 250° C. for 2 hours.

(4) The pore volume is assumed to be 0.52 $cm^3/g$.

(5) A second impregnation is conducted using 0.66 ml of impregnation solution to provide a total loading of 18% by weight Co and 2.8% by weight Re.

(6) The catalyst is dried at 90° C. for 12 hours, and then calcined by increasing the temperature to 250° C. at a rate of 5° C. per minute and then maintaining the temperature at 250° C. for 2 hours.

(7) The pore volume is assumed to be 0.435 $cm^3/g$.

(8) A third impregnation is conducted using 0.63 ml of impregnation solution to provide a total loading of 24% by weight Co and 3.6% by weight Re.

(9) The catalyst is dried at 90° C. for 12 hours, and then calcined by increasing the temperature to 250° C. at a rate of 5° C. per minute and then maintaining the temperature at 250° C. for 2 hours.

(10) The pore volume is assumed to be 0.39 $cm^3/g$.

(11) A fourth impregnation is conducted using 0.61 ml of impregnation solution with the result being a total loading of 28% by weight Co and 4.2% by weight Re.

(12) The catalyst is dried at 90° C. for 12 hours, and then calcined by increasing the temperature to 250° C. at a rate of 5° C. per minute and then maintaining the temperature at 250° C. for 2 hours.

(13) A chemisorption test indicates a 6.3% Co dispersion. The catalyst has a BET surface area of 107 $m^2/g$ and a BJH pore volume of 0.28 $cm^3/g$.

Portions of the sample from the foregoing synthesis are used to continue Co loading to 35% and 40% using the foregoing method.

EXAMPLE 3

A Fisher-Tropsch reaction is conducted in a microchannel reactor. The microchannel reactor contains one process microchannel. The process microchannel has a height of 0.51 mm, a width of 0.7 cm, and a length of 5.1 cm. The process microchannel contains 0.2 gram of a Co/Re catalyst which is supported on $Al_2O_3$. The Co/Re molar ratio is 21. The catalyst is prepared using a multi-impregnation method to achieve a 30% by weight loading of Co, and a 4.5% by weight loading of Re. The metal dispersion in the catalyst is 5.4%. The catalyst is in the form of particulate solids having a particle size in the range of 177-250 microns. The solids are packed in the process microchannel. The process microchannel is cooled with an adjacent heat exchanger to the extent that the temperature gradient within the catalyst is less than 5° C.

Figure 14:
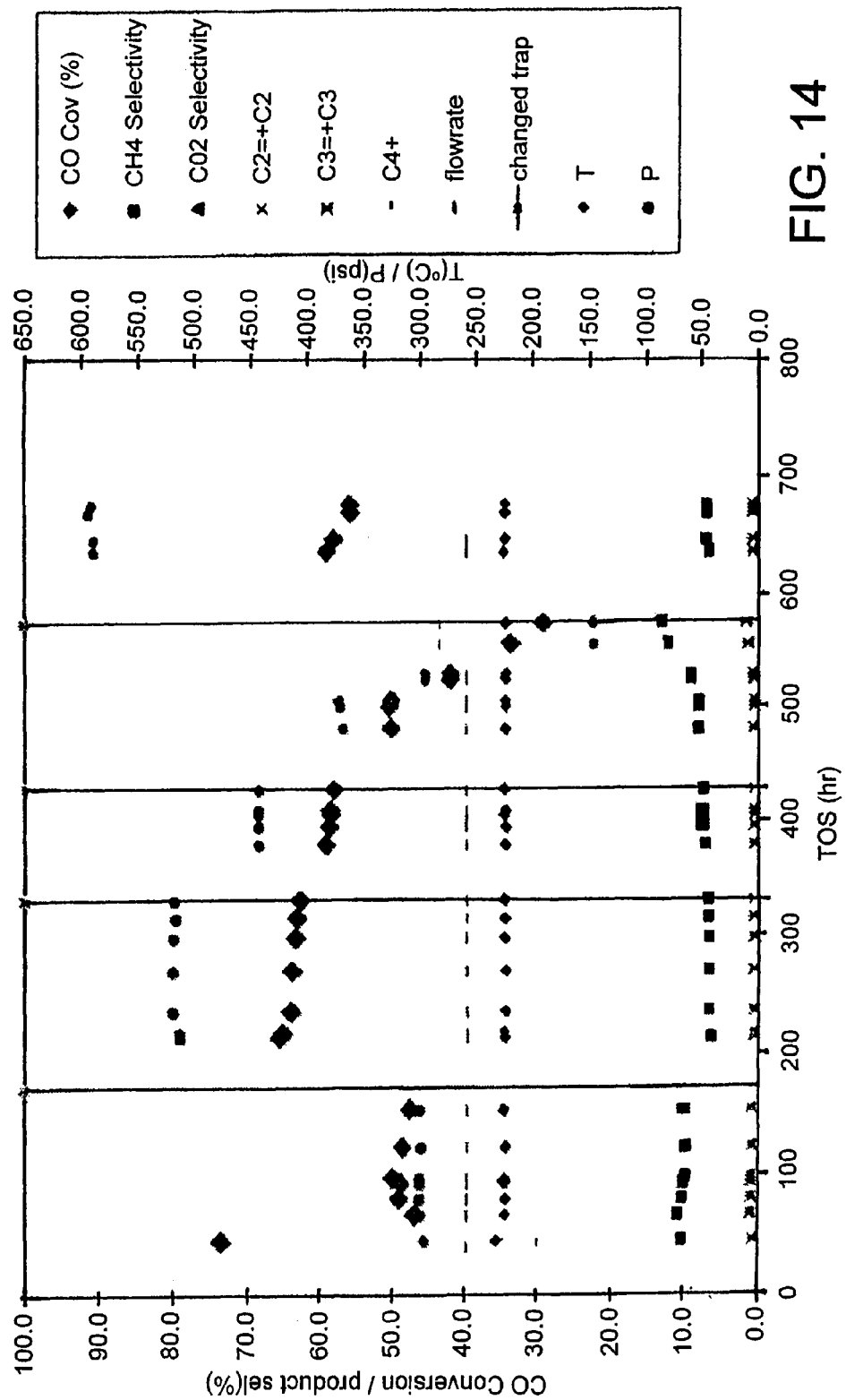
FIGS. 14-17 are plots showing the results of the Fischer-Tropsch synthesis reactions conducted in Example 3.

The reactor is operated at 20 atmospheres with a GHSV of 12520 $hr^{-1}$ which corresponds to 0.26 second contact time. At 224° C. the CO conversion is 50% and the methane selectivity is 10%. The pressure is increased to 35 atmospheres and the initial CO conversion is increased to 65%, and the methane selectivity is reduced to 6.8%. These results are shown in FIG. 14. Analysis of a liquid/wax sample from the product indicates that the chain growth probability is as high as 0.93.

Figure 15:
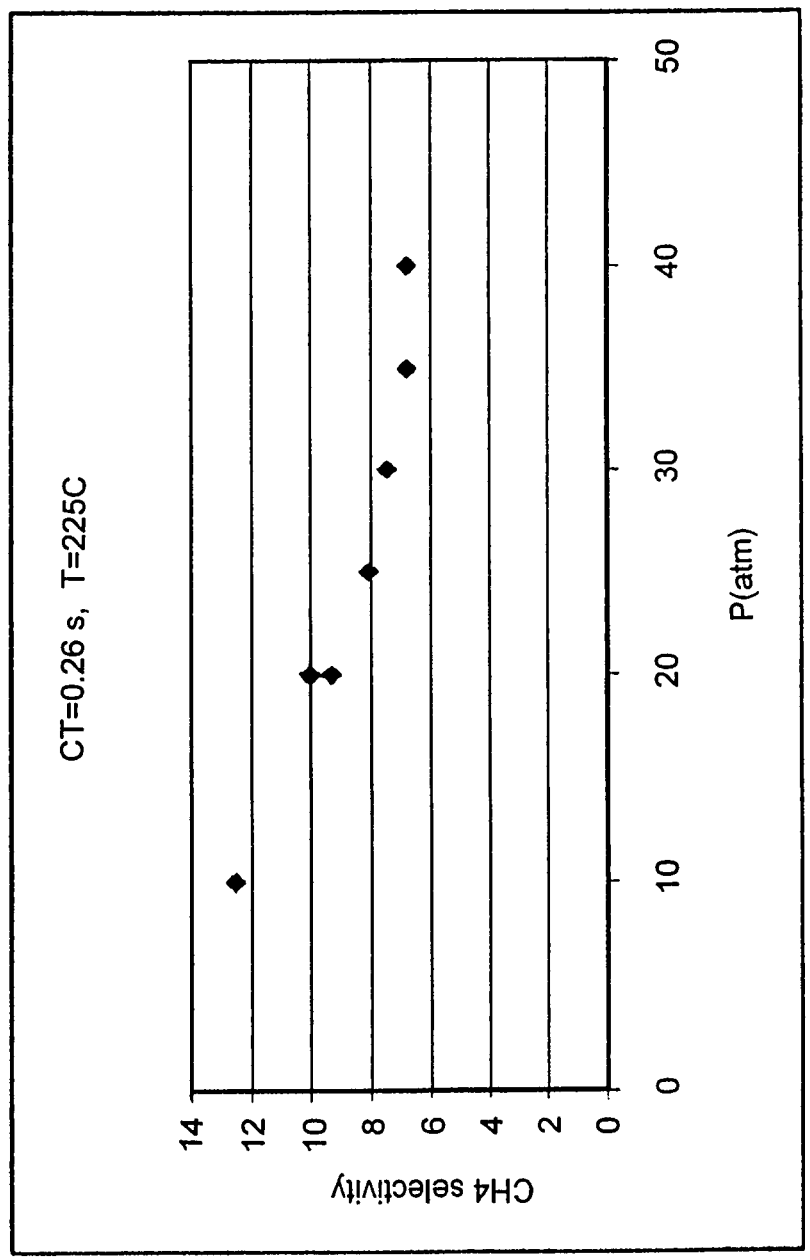

The process is conducted at different operating pressures ranging from 10 to 40 atmospheres, but at the same temperature (225° C.) and contact time (0.26 second). The results are indicated in FIG. 15. The results indicate that the methane selectivity is reduced from 12% to 6.5% when the system pressure increases from 10 atmospheres to 40 atmospheres.

Figure 16:
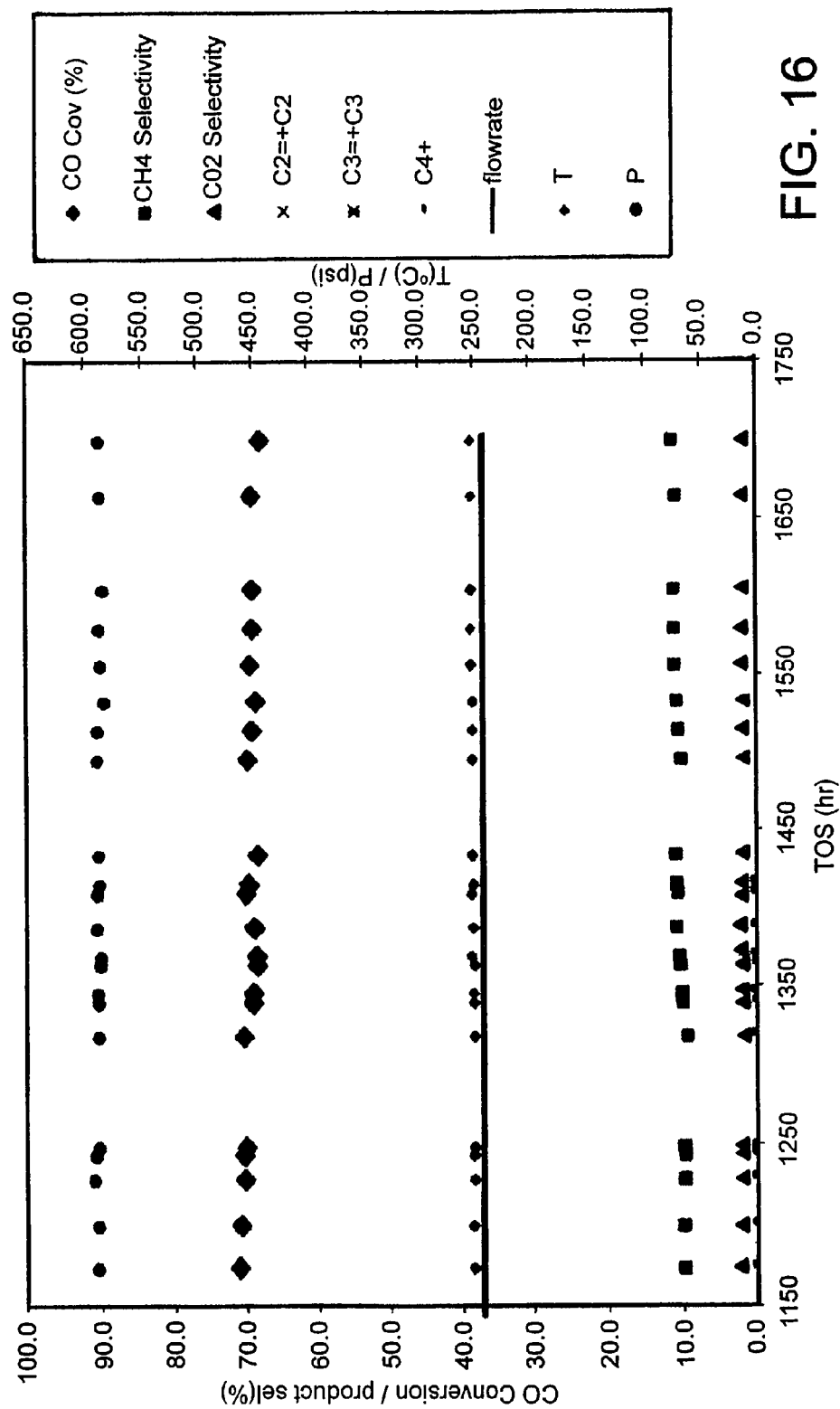

The process is conducted at 250° C. with the results being indicated in FIG. 16. Referring to FIG. 16, the process achieves a CO conversion of 70% with the selectivity to methane being 10%.

Figure 17:
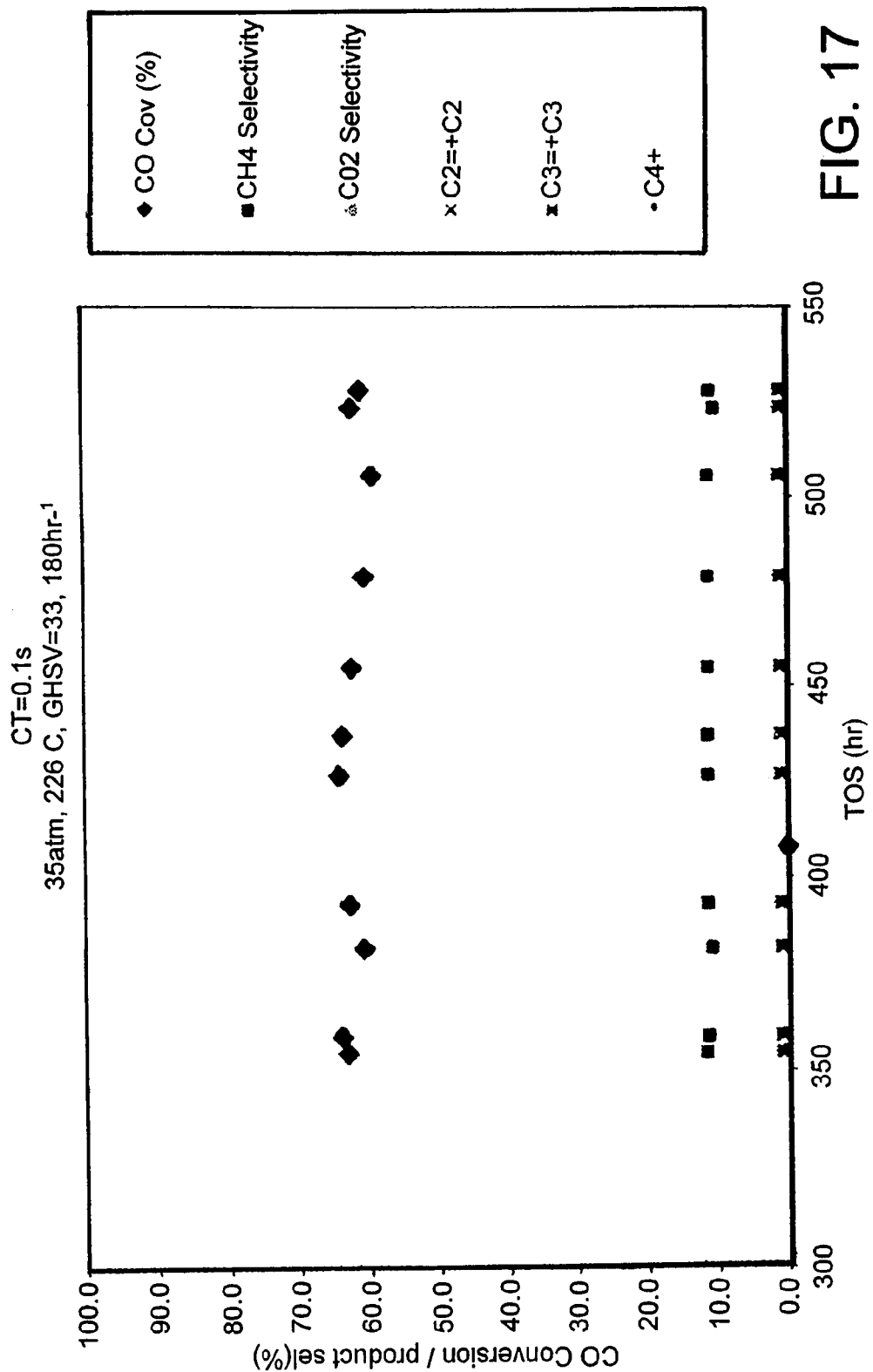

The process is repeated with the contact time being reduced to 0.1 second (GHSV=33,180 $hr^{-1}$) at a pressure of 35 atmospheres and a temperature of 226° C. The results are indicated in FIG. 17 which shows a CO conversion of 63% and a selectivity to methane of 10.5%.

EXAMPLE 4

Two 30% Co-4.5% $Re/Al_2O_3$ catalysts are tested in a Fischer-Tropsch synthesis reaction. One of the catalysts is made using intercalcination steps. The other catalyst is made without intercalcination steps. The catalyst made with the intercalcination steps is made using the following procedure. The support is impregnated with just enough saturated cobalt nitrate and perrhenic acid in water solution to fill its pores. The impregnated support is then heated at 90° C. for 14 hours, then heated to 300° C. at 5° C./min and held at 300° C. for three hours for calcination before cooling to room temperature. This procedure is repeated four times to achieve the desired Co and Re loading.

The catalyst made without the intercalcination steps is made using the following procedure. The support is impregnated with just enough saturated cobalt nitrate and perrhenic acid in water solution to fill its pores. The impregnated support is then heated to 90° C. and kept at 90° C. for 14 hours before cooling to room temperature. This procedure is repeated four times to achieve the desired Co and Re loading. After the last impregnation step the catalyst is heated to 350° C. at a rate of 10° C. per minute and then held at 350° C. for three hours before being allowed to cool to room temperature.

Figure 18:
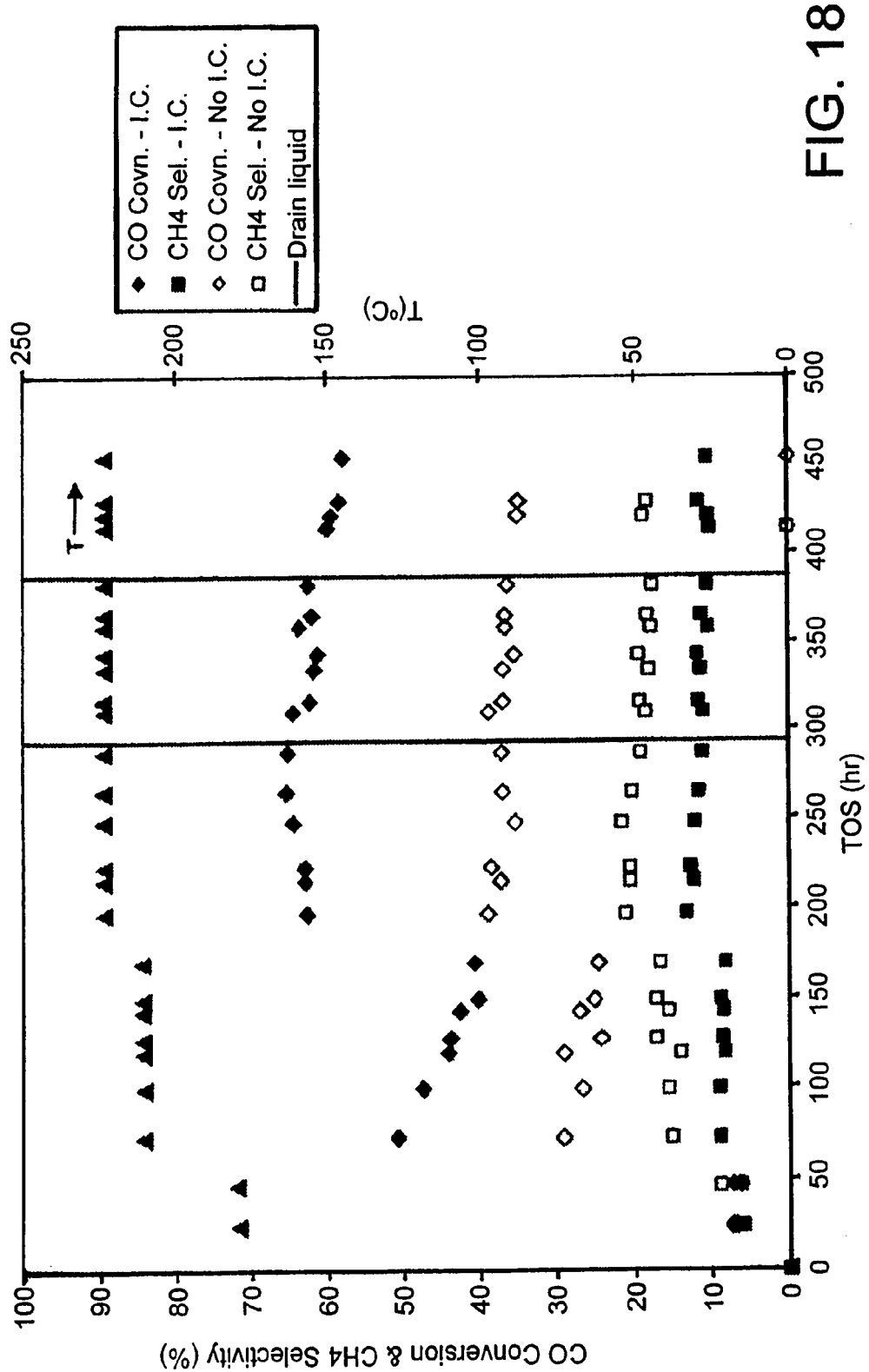
FIG. 18 is a plot showing the differences in Fischer-Tropsch activity and selectivity for catalysts made in Example 4 with and without intercalcinations.

The Fischer-Tropsch reaction is conducted in a microchannel reactor containing 5 process microchannels. The process microchannels have the dimensions of 1.5 mm height, 0.635 cm width and 2.54 cm length. Each process microchannel contains about 0.15 gram of catalyst. The catalyst has a particle size in the range of 150 to 250 microns. The process microchannels are cooled using an adjacent heat exchanger. The reaction is conducted using a reactant composition that contains 63.89 mol % hydrogen, 32.1 mol % carbon monoxide and 4.01 mol % nitrogen. The inlet gage pressure 20.4 atmospheres. The reactor is operated isothermally at the temperature indicated in FIG. 18. The weight hourly space velocity) for carbon monoxide (mass of carbon monoxide fed per unit mass of catalyst per hour) is 4.9. The results are indicated in FIG. 18.

While the invention has been explained in relation to various detailed embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for converting a reactant composition comprising $H_2$ and CO to a product comprising at least one aliphatic hydrocarbon having at least about 5 carbon atoms, the process comprising:
   flowing the reactant composition through a microchannel reactor in contact with a Fischer-Tropsch catalyst to convert the reactant composition to the product, the catalyst comprising Co supported on a support, wherein the catalyst is in the form of particulate solids, the Co loading being at least 25% by weight, the microchannel reactor comprising a plurality of process microchannels containing the catalyst;
   transferring heat from the process microchannels to a heat exchanger; and
   removing the product from the microchannel reactor;
   the process producing at least about 0.5 gram of aliphatic hydrocarbon having at least about 5 carbon atoms per gram of catalyst per hour; and
   the selectivity to methane in the product being less than about 25%.

2. The process of claim 1 wherein each process microchannel has an internal dimension of width or height of up to about 10 mm.

3. The process of claim 1 wherein the process microchannels are made of a material comprising: steel; monel; inconel; aluminum; titanium; nickel;
   copper; brass; an alloy of any of the foregoing metals; a polymer; ceramics; glass; a composite comprising a polymer and fiberglass; quartz; silicon; or a combination of two or more thereof.

4. The process of claim 1 wherein the heat exchanger comprises a plurality of heat exchange channels, the heat exchange channels adjacent to the process microchannels.

5. The process of claim 4 wherein the heat exchange channels comprise microchannels.

6. The process of claim 5 wherein each heat exchange microchannel has an internal dimension of width or height of up to about 10 mm.

7. The process of claim 1 wherein
   the heat exchanger comprises a plurality of heat exchange channels; and
   at least one process microchannel has an adjacent heat exchange channel, the length of the process microchannel and the length of the heat exchange channel being the same.

8. The process of claim 1 wherein
   the heat exchanger comprises a plurality of heat exchange channels; and
   the heat exchanger comprises a heat exchange zone adjacent to at least one process microchannel, the heat exchange zone comprising a plurality of the heat exchange channels, the heat exchange zone extending lengthwise in the same direction as the process microchannel, the length of the heat exchange zone being shorter than the length of the process microchannel, the process microchannel having an entrance and an exit, the heat exchange zone being positioned at or near the process microchannel entrance.

9. The process of claim 1 wherein
   the heat exchanger comprises a plurality of heat exchange channels; and
   the heat exchanger comprises two heat exchange zones adjacent to at least one process microchannel, each heat exchange zone comprising a plurality of the heat exchange channels, the process microchannel having an entrance and an exit, the heat exchange zones extending lengthwise in the same direction as the process microchannel, the lengths of the heat exchange zones being shorter than the length of the process microchannel, the length of one of the heat exchange zones being shorter than the length of the other heat exchange zone, the heat exchange zones being positioned at or near the process microchannel entrance.

10. The process of claim 4 wherein the heat exchange channels are made of a material comprising: steel; monel; inconel; aluminum; titanium; nickel; copper; brass; an alloy of any of the foregoing metals; a polymer; ceramics; glass; a composite comprising polymer and fiberglass; quartz; silicon; or a combination of two or more thereof.

11. The process of claim 1 wherein the microchannel reactor has an entrance and an exit, the product exits the microchannel reactor through the exit, the product being intermixed with unreacted components from the reactant composition, and at least part of the unreacted components from the reactant composition are recycled to the entrance to the microchannel reactor.

12. The process of claim 1 wherein the reactant composition enters the process microchannels and the product exits the process microchannels, the temperature of the reactant composition entering the process microchannels being within about 200° C. of the temperature of the product exiting the process microchannels.

13. The process of claim 1 wherein the mole ratio of $H_2$ to CO in the reactant composition is in the range of about 0.8 to about 10.

14. The process of claim 1 wherein the reactant composition further comprises $H_2O$, $CO_2$, a hydrocarbon of 1 to about 4 carbon atoms, or a mixture of two or more thereof.

15. The process of claim 1 wherein
   the heat exchanger comprises a plurality of heat exchange channels, the heat exchange channels containing a heat exchange fluid; and
   the heat exchange fluid undergoes a phase change as it flows through the heat exchange channels.

16. The process of claim 1 wherein the heat exchanger comprises a plurality of heat exchange channels and an endothermic process is conducted in the heat exchange channels.

17. The process of claim 16 wherein the endothermic process comprises a steam reforming reaction or a dehydrogenation reaction.

18. The process of claim 1 wherein
   the heat exchanger comprises a plurality of heat exchange channels, the heat exchange channels containing a heat exchange fluid; and
   the reactant composition and product flow through the process microchannels in a first direction, and the heat exchange fluid flows through the heat exchange channels in a second direction, the second direction being cross current relative to the first direction.

19. The process of claim 1 wherein the heat exchanger contains a heat exchange fluid and the heat exchange fluid comprises air, steam, liquid water, carbon dioxide, gaseous nitrogen, a gaseous hydrocarbon or a liquid hydrocarbon.

20. The process of claim 1 wherein the catalyst further comprises Fe, Ni, Ru, Re, Os, or an oxide thereof, or a mixture of two or more thereof.

21. The process of claim 1 wherein the catalyst comprises a promoter selected from a metal from Group IA, IIA, IIIB or IIB of the Periodic Table or an oxide thereof, a lanthanide metal or oxide, an actinide metal or oxide, or a combination of two or more thereof.

22. The process of claim 1 wherein the catalyst comprises a promoter selected from the group consisting of Li, B, Na, K, Rb, Cs, Mg, Ca, Sr, Ba, Sc, Y, La, Ac, Ti, Zr, La, Ac, Ce or Th, or an oxide thereof, or a mixture of two or more thereof.

23. The process of claim 1 wherein the support is selected from alumina, zirconia, silica, aluminum fluoride, fluorided alumina, bentonite, ceria, zinc oxide, silica-alumina, silicon carbide, a molecular sieve, or a combination of two or more thereof.

24. The process of claim 1 wherein the catalyst comprises a refractory oxide support.

25. The process of claim 1 wherein the catalyst comprises a composition represented by the formula $CoM^1_a M^2_b O_x$ wherein $M^1$ is Fe, Ni, Ru, Re, Os, or a mixture of two or more thereof;

$M^2$ is Li, B, Na, K, Rb, Cs, Mg, Ca, Sr, Ba, Sc, Y, La, Ac, Ti, Zr, La, Ac, Ce or Th, or a mixture of two or more thereof;

a is a number in the range of zero to about 0.5;

b is a number in the range of zero to about 0.5; and x is the number of oxygens needed to fulfill the valency requirements of the elements present.

26. The process of claim 1 wherein the catalyst comprises Co supported on alumina, the Co loading being at least about 28% by weight.

27. The process of claim 26 wherein the catalyst further comprises Re, Ru or a mixture thereof.

28. The process of claim 1 wherein the catalyst comprises a catalytic metal and a support, the catalyst being made by the steps of:

(A) impregnating the support with a composition comprising a catalytic metal to provide an intermediate catalytic product;

(B) calcining the intermediate catalytic product formed in step (A);

(C) impregnating the calcined intermediate product formed in step (B) with another composition comprising a catalytic metal to provide another intermediate catalytic product; and (D) calcining the another intermediate catalytic product formed in step (C) to provide the catalyst.

29. The process of claim 28 wherein the composition comprising a catalytic metal comprises a cobalt nitrate solution and the support comprises alumina.

30. The process of claim 1 wherein the catalyst is washcoated on interior walls of the process microchannels, grown on interior walls of the process microchannels from solution, or coated in situ on a fin structure.

31. The process of claim 1 wherein the catalyst is supported by a support structure made of a material comprising an alloy comprising Ni, Cr and Fe, or an alloy comprising Fe, Cr, Al and Y.

32. The process of claim 1 wherein the catalyst is supported on a support structure having a flow-by configuration, a flow-through configuration, or a serpentine configuration.

33. The process of claim 1 wherein the catalyst is supported on a support structure having the configuration of a foam, felt, wad, fin, or a combination of two or more thereof.

34. The process of claim 1 wherein the catalyst is supported on a support structure having a flow-by configuration with an adjacent gap, a foam configuration with an adjacent gap, a fin structure with gaps, a washcoat on a substrate, or a gauze configuration with a gap for flow.

35. The process of claim 1 wherein the catalyst is supported on a support structure in the form of a fin assembly comprising at least one fin 36. The process of claim 35 wherein the fin assembly comprises a plurality of parallel spaced fins.

37. The process of claim 35 wherein the fin has an exterior surface and a porous material overlies at least part of the exterior surface of the fin, the catalyst being supported by the porous material.

38. The process of claim 37 wherein the porous material comprises a coating, fibers, foam or felt.

39. The process of claim 35 wherein the fin has an exterior surface and a plurality of fibers or protrusions extend from at least part of the exterior surface of the fin, the catalyst being supported by the protrusions.

40. The process of claim 35 wherein the fin has an exterior surface and the catalyst is: washcoated on at least part of the exterior surface of the fin; grown on at least part of the exterior surface of the fin from solution; or deposited on at least part of the exterior surface of the fin using vapor deposition.

41. The process of claim 35 wherein the fin assembly comprises a plurality of parallel spaced fins, at least one of the fins having a length that is different than the length of the other fins.

42. The process of claim 35 wherein the fin assembly comprises a plurality of parallel spaced fins, at least one of the fins having a height that is different than the height of the other fins.

43. The process of claim 35 wherein the fin has a cross section having the shape of a square, a rectangle, or a trapezoid.

44. The process of claim 35 wherein the fin is made of a material comprising: steel; aluminum; titanium; iron; nickel; platinum; rhodium; copper; chromium; brass; an alloy of any of the foregoing metals; a polymer; ceramics; glass; a composite comprising polymer and fiberglass; quartz; silicon; or a combination of two or more thereof.

45. The process of claim 35 wherein the fin is made of an alloy comprising Ni, Cr and Fe, or an alloy comprising Fe, Cr, Al and Y.

46. The process of claim 35 wherein the fin is made of an $Al_2O_3$ forming material or a $Cr_2O_3$ forming material.

47. The process of claim 1 wherein the process microchannels have a bulk flow path comprising about 5% to about 95% of the cross sections of such process microchannels.

48. The process of claim 1 wherein the contact time of the reactant composition and/or product with the catalyst is up to about 2000 milliseconds.

49. The process of claim 1 wherein the temperature of the reactant composition entering the process microchannels is in the range of about 150° C. to about 270° C.

50. The process of claim 1 wherein the pressure within the process microchannels is at least about 5 atmospheres.

51. The process of claim 1 wherein the space velocity for the flow of the reactant composition and product through the process microchannels is at least about 1000 hr.$^{-1}$ 52. The process of claim 1 wherein the pressure drop for the flow of the reactant composition and product through the process microchannels is up to about 10 atmospheres per meter of length of the process microchannels.

53. The process of claim 1 wherein
the heat exchanger comprises a plurality of heat exchange channels, the heat exchange channels containing a heat exchange fluid; and
the heat exchange fluid flows through the heat exchange channels, the pressure drop for the heat exchange fluid flowing through the heat exchange channels being up to about 10 atmospheres per meter of length of the heat exchange channels.

54. The process of claim 1 wherein the conversion of CO is about 40% or higher per cycle.

55. The process of claim 1 wherein the yield of product is about 25% or higher per cycle.

56. The process of claim 1 wherein the conversion of CO is at least about 50% per cycle, the selectivity to methane in the product is about 15% or less, and the yield of product is at least about 35% per cycle.

57. The process of claim 1 wherein the median particle diameter of the particulate solids is in the range of about 1 to about 1000 µm, and the length of each process microchannel is up to about 500 cm.

58. The process of claim 1 wherein the product comprises hydrocarbons boiling at a temperature at or below about 350° C. at atmospheric pressure.

59. The process of claim 1 wherein the product comprises hydrocarbons boiling at or above a temperature of about 350° C. at atmospheric pressure.

60. The process of claim 1 wherein the product comprises a middle distillate.

61. The process of claim 1 wherein the product comprises at least one olefin.

62. The process of claim 1 wherein the product comprises a normal paraffin, isoparaffin, or mixture thereof.

63. The process of claim 1 wherein the product is further processed using hydrocracking, hydroisomerizing or dewaxing.

64. The process of claim 1 wherein the product is further processed to form a lubricating base oil or a diesel fuel.

65. The process of claim 1 wherein the process microchannels are vertically oriented, the reactant composition and product flow downwardly through the process microchannels.

66. The process of claim 1 wherein subsequent to removing the product from the microchannel reactor a regenerating fluid flows through the process microchannels in contact with the catalyst, the residence time for the regenerating fluid in the process microchannels being from about 0.01 to about 1000 seconds.

67. A process for converting a reactant composition comprising $H_2$ and CO to a product comprising at least one aliphatic hydrocarbon having at least about 5 carbon atoms, the process comprising:
flowing the reactant composition through a microchannel reactor in contact with a Fischer-Tropsch catalyst to convert the reactant composition to the product, the microchannel reactor comprising a plurality of process microchannels containing the catalyst, the catalyst being in the form of a fixed bed of particulate solids, a median particle diameter of the particulate solids in the range of about 1 to about 1000 µm;
transferring heat from the process microchannels to a heat exchanger; and
removing the product from the microchannel reactor;
the contact time of the reactant composition with the catalyst being up to about 2000 ms;
the process producing at least about 0.5 gram of aliphatic hydrocarbon having at least about 5 carbon atoms per gram of catalyst per hour; and
the selectivity to methane in the product being less than about 25%.

68. A process for converting a reactant composition comprising $H_2$ and CO to a product comprising at least one aliphatic hydrocarbon having at least about 5 carbon atoms, the process comprising:
flowing the reactant composition through a microchannel reactor in contact with a Fischer-Tropsch catalyst to convert the reactant composition to the product, the microchannel reactor comprising a plurality of process microchannels containing the catalyst, the catalyst being in the form of a fixed bed of particulate solids, the catalyst comprising Co supported on alumina, the catalyst having a Co loading of at least about 25% by weight and a Co dispersion of at least 3%;
transferring heat from the process microchannels to a heat exchanger; and
removing the product from the microchannel reactor;
the contact time of the reactant composition with the catalyst being up to about 300 ms;
the process producing at least about 0.5 gram of aliphatic hydrocarbon having at least about 5 carbon atoms per gram of catalyst per hour;
the selectivity to methane in the product being less than about 25%.

69. The process of claim 1 wherein the reactant composition comprises a product of a coal gasification process.

70. The process of claim 67 wherein the reactant composition comprises a product of a coal gasification process.

71. The process of claim 68 wherein the reactant composition comprises a product of a coal gasification process.

72. The process of claim 1 wherein the heat exchanger comprises a plurality of heat exchange channels extending lengthwise at right angles relative to the lengthwise direction of the process microchannels, the heat exchange channels containing a heat exchange fluid.

73. A process for converting a reactant composition comprising $H_2$ and CO to a product comprising at least one aliphatic hydrocarbon having at least about 5 carbon atoms, the process comprising:
flowing the reactant composition through a microchannel reactor in contact with a Fischer-Tropsch catalyst to convert the reactant composition to the product, the microchannel reactor comprising a plurality of process microchannels containing the catalyst, the catalyst being in the form of a fixed bed of particulate solids, a median particle diameter of the particulate solids in the range of about 1 to about 1000 µm;
transferring heat from the process microchannels to a heat exchanger; and
removing the product from the microchannel reactor;
the process producing at least about 0.5 gram of aliphatic hydrocarbon having at least about 5 carbon atoms per gram of catalyst per hour;
the conversion of CO is about 40% or higher per cycle; and
the selectivity to methane in the product being less than about 25%.

74. The process of claim 73 wherein the reactant composition comprises a product of a coal gasification process.

75. A process for converting a reactant composition comprising $H_2$ and CO to a product comprising at least one aliphatic hydrocarbon having at least about 5 carbon atoms, the process comprising:

flowing the reactant composition through a microchannel reactor in contact with a Fischer-Tropsch catalyst to convert the reactant composition to the product, the catalyst comprising Co supported on a support, the microchannel reactor comprising a plurality of process microchannels containing the catalyst, the catalyst being in the form of a fixed bed of particulate solids, a median particle diameter of the particulate solids in the range of about 1 to about 1000 μm;

transferring heat from the process microchannels to a heat exchanger; and removing the product from the microchannel reactor;

the process producing at least about 0.5 gram of aliphatic hydrocarbon having at least about 5 carbon atoms per gram of catalyst per hour; and the selectivity to methane in the product being less than about 25%.

76. The process of claim 75 wherein each process microchannel has an internal dimension of width or height of up to about 10 mm.

77. The process of claim 75 wherein the process microchannels are made of a material comprising: steel; monel; inconel; aluminum; titanium; nickel; copper; brass; an alloy of any of the foregoing metals; a polymer; ceramics; glass; a composite comprising a polymer and fiberglass; quartz; silicon; or a combination of two or more thereof.

78. The process of claim 75 wherein the microchannel reactor has an entrance and an exit, the product exits the microchannel reactor through the exit, the product being intermixed with unreacted components from the reactant composition, and at least part of the unreacted components from the reactant composition are recycled to the entrance to the microchannel reactor.

79. The process of claim 75 wherein the reactant composition enters the process microchannels and the product exits the process microchannels, the temperature of the reactant composition entering the process microchannels being within about 200° C. of the temperature of the product exiting the process microchannels.

80. The process of claim 75 wherein the mole ratio of $H_2$ to CO in the reactant composition is in the range of about 0.8 to about 10.

81. The process of claim 75 wherein the reactant composition further comprises $H_2O$, $CO_2$, a hydrocarbon of 1 to about 4 carbon atoms, or a mixture of two or more thereof.

82. The process of claim 75 wherein the catalyst is washcoated on interior walls of the process microchannels, grown on interior walls of the process microchannels from solution, or coated in situ on a fin structure.

83. The process of claim 75 wherein the catalyst is supported by a support structure made of a material comprising an alloy comprising Ni, Cr and Fe, or an alloy comprising Fe, Cr, Al and Y.

84. The process of claim 75 wherein the catalyst is supported on a support structure having a flow-by configuration, a flow-through configuration, or a serpentine configuration.

85. The process of claim 75 wherein the catalyst is supported on a support structure having the configuration of a foam, felt, wad, fin, or a combination of two or more thereof.

86. The process of claim 75 wherein the catalyst is supported on a support structure having a flow-by configuration with an adjacent gap, a foam configuration with an adjacent gap, a fin structure with gaps, a washcoat on a substrate, or a gauze configuration with a gap for flow.

87. The process of claim 75 wherein the catalyst is supported on a support structure in the form of a fin assembly comprising a plurality of parallel spaced fins.

88. The process of claim 75 wherein the process microchannels have a bulk flow path comprising about 5% to about 95% of the cross sections of such process microchannels.

89. The process of claim 75 wherein the contact time of the reactant composition and/or product with the catalyst is up to about 2000 milliseconds.

90. The process of claim 75 wherein the temperature of the reactant composition entering the process microchannels is in the range of about 150° C. to about 270° C.

91. The process of claim 75 wherein the pressure within the process microchannels is at least about 5 atmospheres.

92. The process of claim 75 wherein the conversion of CO is about 40% or higher per cycle.

93. The process of claim 75 wherein the conversion of CO is at least about 50% per cycle, the selectivity to methane in the product is about 15% or less, and the yield of product is at least about 35% per cycle.

94. The process of claim 75 wherein the median particle diameter of the particulate solids is in the range of about 1 to about 1000 μm, and the length of each process microchannel is up to about 500 cm.

\* \* \* \* \*